United States Patent
Shin et al.

(10) Patent No.: US 9,841,646 B2
(45) Date of Patent: Dec. 12, 2017

(54) LIQUID CRYSTAL DISPLAY

(71) Applicant: SAMSUNG DISPLAY CO., LTD., Yongin, Gyeonggi-do (KR)

(72) Inventors: Min Gyeong Shin, Anyang-si (KR); Hui Gyeong Yun, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 15/085,302

(22) Filed: Mar. 30, 2016

(65) Prior Publication Data

US 2017/0068137 A1 Mar. 9, 2017

(30) Foreign Application Priority Data

Sep. 8, 2015 (KR) .................. 10-2015-0127096

(51) Int. Cl.
*G02F 1/133* (2006.01)
*G02F 1/1362* (2006.01)
*G02F 1/1337* (2006.01)

(52) U.S. Cl.
CPC ...... *G02F 1/1362* (2013.01); *G02F 1/133707* (2013.01); *G02F 2001/133738* (2013.01); *G02F 2001/136218* (2013.01)

(58) Field of Classification Search
CPC ...... G02F 1/133; G02F 1/1335; G02F 1/1343; G02F 1/136; G02F 1/1368; G02F 1/134309; G02F 1/136286; G02F 1/133514; G02F 1/133345; G02F 1/133512; G02F 1/133707; G02F 1/134336; G02F 1/136227; G02F 1/133528; G02F 1/1337; G02F 1/1345; G02F 1/13458; G02F 1/13306; G02F 1/1333; G02F 1/1362; G02F 1/136204; G02F 2201/123; G02F 2001/134345; G02F 2001/136222; G02F 2001/136218; G02F 2001/134318; G09G 2300/0447; G09G 2300/0439; G09G 2320/0252; G09G 2320/0626; G09G 2310/0232
USPC ..... 349/96, 143, 144, 33, 43, 139, 138, 106, 349/141, 149, 152, 129, 54
See application file for complete search history.

(56) References Cited

U.S. PATENT DOCUMENTS

| | | | | |
|---|---|---|---|---|
| 6,011,274 A | * | 1/2000 | Gu | G02F 1/1368 257/258 |
| 2004/0150768 A1 | * | 8/2004 | Shimizu | G02F 1/134363 349/106 |
| 2011/0085100 A1 | * | 4/2011 | Kim | G02F 1/134363 349/41 |

(Continued)

FOREIGN PATENT DOCUMENTS

KR 100452419 B1 10/2004
KR 1020080100642 A 11/2008

(Continued)

*Primary Examiner* — Thoi Duong
(74) *Attorney, Agent, or Firm* — Cantor Colburn LLP

(57) ABSTRACT

A liquid crystal display includes a first substrate in which a pixel region is defined by a gate line and a data line intersecting the gate line, the pixel region being arranged in a matrix with other pixel regions, a pixel electrode disposed in the pixel region, and a shielding electrode disposed between the pixel electrode and another pixel electrode, wherein the shielding electrode is electrically connected to the data line and a different voltage from a voltage applied to the data line is applied to the shielding electrode.

19 Claims, 14 Drawing Sheets

(56) References Cited

U.S. PATENT DOCUMENTS

2015/0192832 A1* 7/2015 Liao ................. G02F 1/1368
349/43

FOREIGN PATENT DOCUMENTS

| KR | 1020090129774 A | 12/2009 |
| KR | 101388588 B1 | 4/2014 |
| KR | 1020150014197 A | 2/2015 |
| KR | 1020150039002 A | 4/2015 |

* cited by examiner

LIQUID CRYSTAL DISPLAY

This application claims priority to Korean Patent Application No. 10-2015-0127096 filed on Sep. 8, 2015, and all the benefits accruing therefrom under 35 U.S.C. §119, the content of which in its entirety is herein incorporated by reference.

BACKGROUND

1. Field

Exemplary embodiments of the invention generally relate to a liquid crystal display ("LCD").

2. Description of the Related Art

A liquid crystal display ("LCD") is one of the most widely used flat panel displays. An LCD includes two panels provided with field-generating electrodes such as pixel electrodes and a common electrode and a liquid crystal layer interposed therebetween. The LCD displays an image by applying a voltage to the field-generating electrodes to generate an electric field in the liquid crystal layer, to determine the orientation of liquid crystal molecules in the liquid crystal layer, and thus to adjust polarization of incident light.

To realize a wide viewing angle, a vertical alignment ("VA")-mode LCD may form, in one pixel, a plurality of domains that differ from one another in the alignment direction of liquid crystal molecules.

To form a plurality of domains in one pixel, a method has been suggested in which cutouts such as slits are formed on a field-generating electrode. In this method, a plurality of domains may be formed by allowing liquid crystal molecules to be realigned due to a fringe field formed between edges of the cutouts and the field-generating electrode facing the edges.

SUMMARY

In a case of a method of forming a pixel electrode with a plurality of branch electrodes by forming minute slits on the pixel electrode, in particular, an aperture ratio of a liquid crystal display ("LCD") may decrease, and a force of control of liquid crystal molecules at the corners of the pixel electrode may be weakened.

Exemplary embodiments of the invention provide an LCD which improves the display quality by improving the force of control of liquid crystal molecules at the corners of each pixel so as to minimize distortion of liquid crystal directors and thus to improve transmittance.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, an LCD includes a first substrate in which a pixel region is defined by a gate line and a data line intersecting the gate line, the pixel region being arranged in a matrix with other pixel regions, a pixel electrode disposed in the pixel region, and a shielding electrode disposed between the pixel electrode and another pixel electrode, wherein the shielding electrode is electrically connected to the data line and a different voltage from a voltage applied to the data line is applied to the shielding electrode.

In an exemplary embodiment, the voltage applied to the shielding electrode may be lower than the voltage applied to the pixel electrode by about 1.5 volts (V) to about 2.5 V.

In an exemplary embodiment, the shielding electrode may include an electrode material having a higher specific resistivity than a material of the data line.

In an exemplary embodiment, the shielding electrode includes at least one of indium zinc oxide ("IZO"), indium tin oxide ("ITO"), indium gallium zinc oxide ("IGZO"), and a combination thereof.

In an exemplary embodiment, the shielding electrode may be elongated in a zigzag shape.

In an exemplary embodiment, the LCD further includes a second substrate facing the first substrate, and a liquid crystal layer including liquid crystal molecules, which are disposed between the first substrate and the second substrate, wherein the second substrate includes a common electrode, a different voltage from the voltage applied to the shielding electrode is applied to the common electrode, and the shielding electrode generates a similar potential to a potential generated by the pixel electrode.

In an exemplary embodiment, the common electrode may include a horizontal cutout portion, which horizontally divides the pixel electrode, and a vertical cutout portion, which vertically divides the pixel electrode.

In an exemplary embodiment, a width of the horizontal and vertical cutout portions may range from about 2 micrometers (μm) to about 5 μm.

In an exemplary embodiment, an electric field may be relatively weakened in an area of overlap between the common electrode and the shielding electrode, compared to an electric field in the pixel electrode near the shielding electrode.

In an exemplary embodiment, the pixel electrode and the shielding electrode may be spaced from each other by a distance of about 3 μm to about 5 μm.

In an exemplary embodiment, the pixel electrode may include a whole electrode and branch electrodes, which are provided in the shape of branches at corners of the pixel region.

In an exemplary embodiment, the pixel region may include slit patterns, which separate the branch electrodes from one another by a predetermined gap.

In an exemplary embodiment, the shielding electrode may include liquid crystal control slits, which are arranged in a staggered manner with respect to the slit patterns, which are disposed in the pixel region.

In an exemplary embodiment, the shielding electrode may include liquid crystal control electrodes, which are arranged in a staggered manner with respect to the slit patterns, which are disposed in the pixel region.

In an exemplary embodiment, a direction in which the branch electrodes or the slit patterns extend may be the same as an azimuth of the liquid crystal molecules.

In an exemplary embodiment, a horizontal field may be provided between the shielding electrode and the pixel electrode.

In an exemplary embodiment, the Liquid crystal control electrodes of the shielding electrode, which may be disposed near slit patterns that are disposed near edges of the pixel electrode, provide a vector for driving liquid crystal molecules disposed in an area of the edges of the pixel electrode and on the liquid crystal control electrodes to move regularly in a particular direction.

In an exemplary embodiment, the LCD further includes a data pad line extending from the data line into a non-display area, a data pad disposed at an end of the data pad line, a pad portion disposed on the data pad, a pad line extending from the pad portion, a shielding pad line disposed to overlap part of the pad line and extending from the shielding electrode into the non-display area, and a first shielding contact hole connecting part of the shielding pad line and part of the pad line.

In an exemplary embodiment, the LCD further includes a data pad line extending from the data line into a non-display area, a data pad disposed at an end of the data pad line, a shielding pad line disposed to overlap part of the pad line and extending from the shielding electrode into the non-display area, and a second shielding contact hole connecting part of the shielding pad line and part of the data pad line.

According to the exemplary embodiments, it is possible to improve the visibility and transmittance of an LCD by applying different voltages to a shielding electrode and a pixel electrode.

Other features and exemplary embodiments will be apparent from the following detailed description, the drawings, and the claims.

BRIEF DESCRIPTION OF THE DRAWINGS

The above and other features and advantages of the invention will become more apparent by describing in detail embodiments thereof with reference to the attached drawings in which.

DETAILED DESCRIPTION

Figure 1:
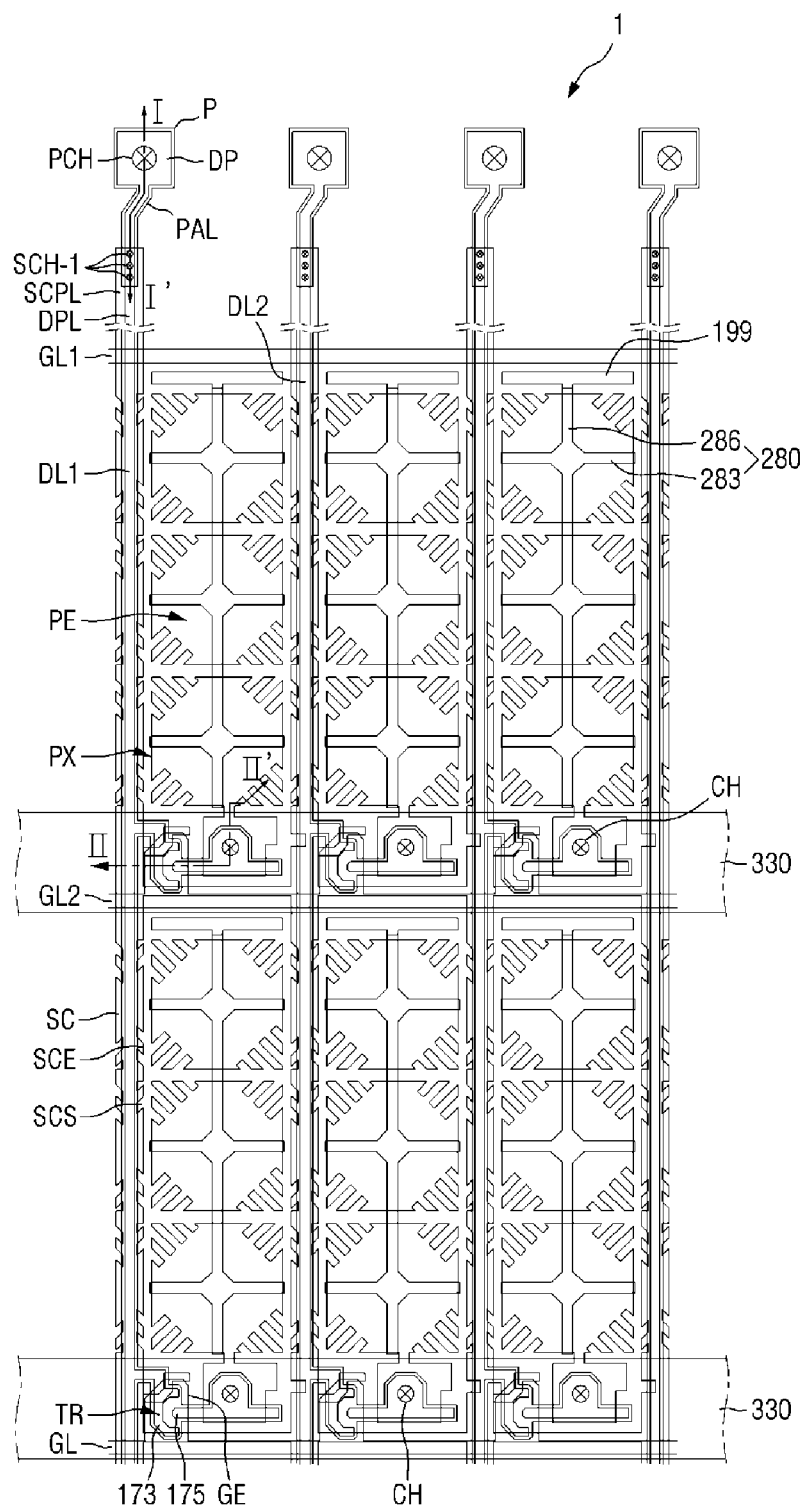
FIG. 1 is a plan view of an exemplary embodiment of a liquid crystal display ("LCD") according to the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments will hereinafter be described with reference to the accompanying drawings.

Figure 2:
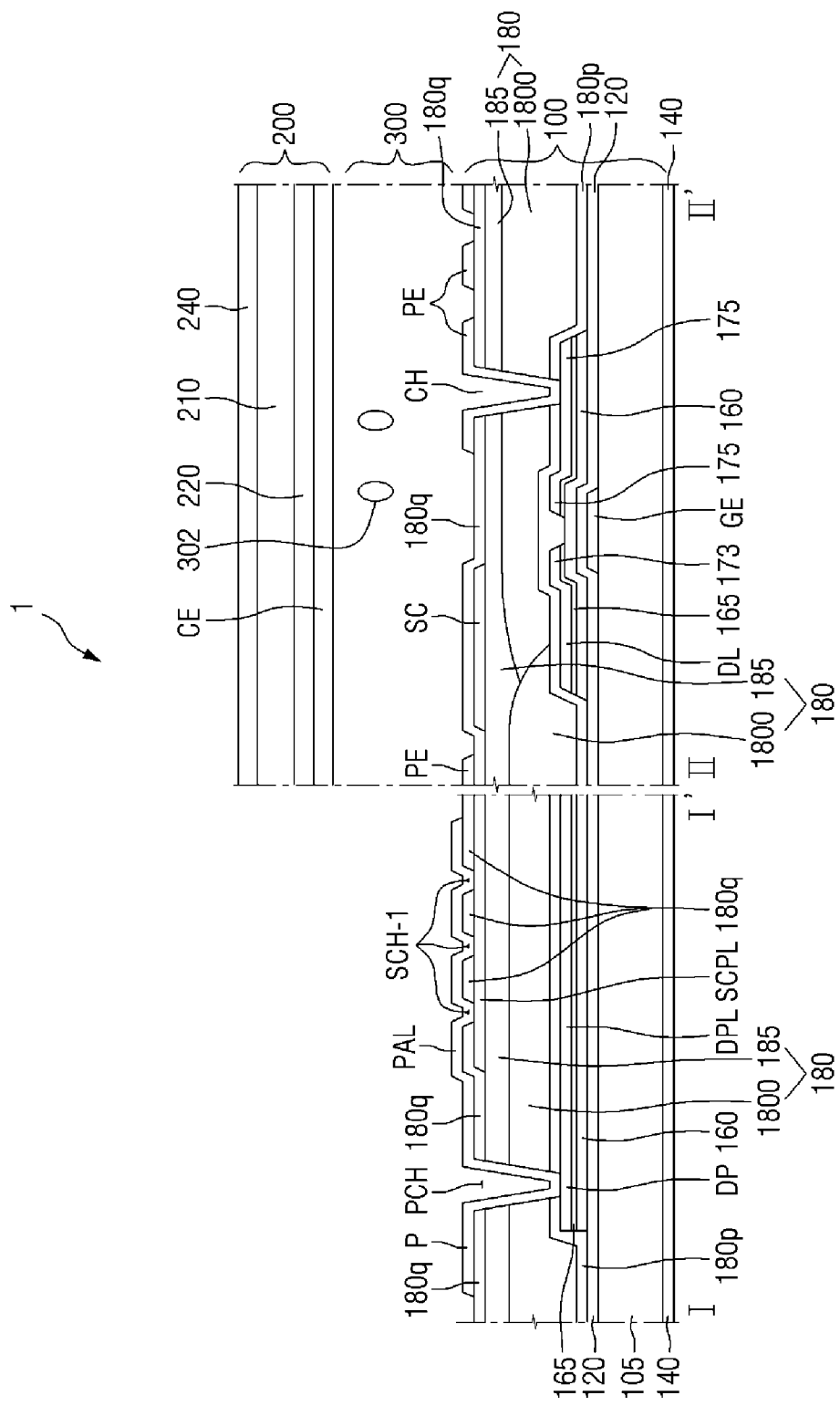
FIG. 2 illustrates cross-sectional views taken along line I-I' and II-II', respectively, of FIG. 1.
Figure 3:
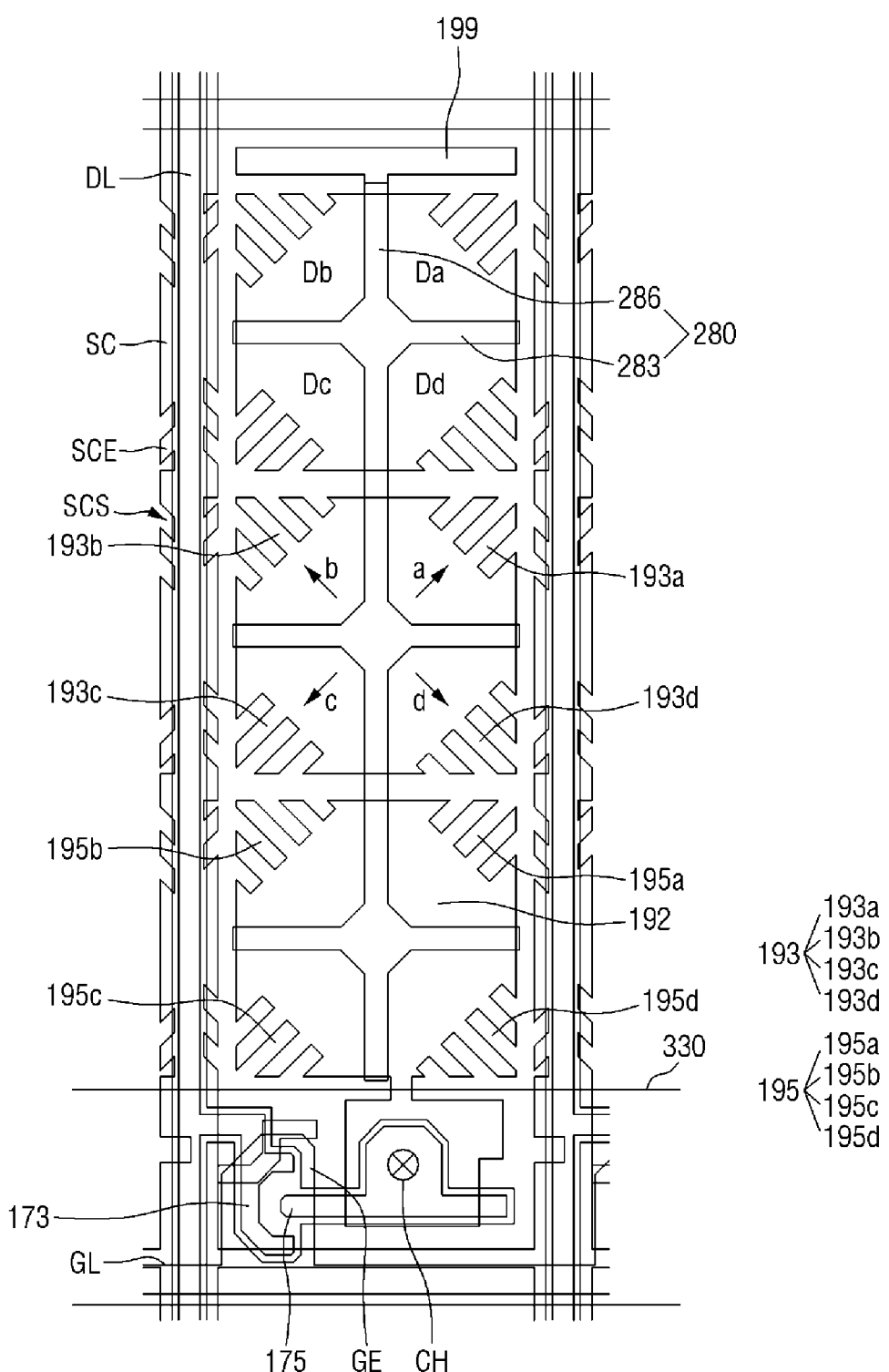
FIG. 3 is an enlarged view of a pixel of the LCD of FIG. 1.

FIG. 1 is a plan view of a liquid crystal display ("LCD") according to an exemplary embodiment of the invention, FIG. 2 illustrates cross-sectional views taken along line I-I' and II-II', respectively, of FIG. 1, and FIG. 3 is an enlarged view of a pixel of the LCD of FIG. 1.

Referring to FIGS. 1 and 2, an LCD 1 includes a first panel 100 and a second panel 200, which face each other, and a liquid crystal layer 300, which is disposed between the first and second panels 100 and 200.

For convenience, the LCD 1 will hereinafter be described with reference to FIGS. 1 to 3, focusing mainly on one pixel and its corresponding gate line and data line. However, in reality, the LCD 1 may include a plurality of pixels, which are arranged in a matrix of rows and columns, and the plurality of pixels may be arranged at, or near, the intersections between a plurality of gate lines, which extend in a row direction, and a plurality of data lines, which extend in a column direction.

The first panel 100 may include a first substrate 105, a first electrode and a first alignment film, which are sequentially disposed on a first surface of the first substrate 105, and a first polarizing plate 140, which is disposed on a second surface of the first substrate 105. In an exemplary embodiment, the first electrode of the first panel 100 may be, for example, a pixel electrode PE.

The second panel 200 may include a second substrate 210, a second electrode and a second alignment film, which are sequentially disposed on a first surface of the second substrate 210, and a second polarizing plate 240, which is disposed on a second surface of the second substrate 210. In an exemplary embodiment, the second electrode of the second panel 200 may be, for example, a common electrode CE.

One of the first and second polarizing plates 140 and 240 may not be provided. One or both of the first and second alignment films may not be provided.

In an exemplary embodiment, a pixel PX may be substantially rectangular. The pixel electrode PE may be disposed to correspond to, and cover, the pixel PX.

The common electrode CE may be unitarily provided on the entire surface of the second panel 200. A cutout 280 may be defined in parts of the common electrode CE, but the invention is not limited thereto. The cutout 280 may include a plurality of domains, which are defined along directions in which the cutout 280 are defined.

The first panel 100 or the second panel 200 may also include a switching device, a color filter 1800, and a light-shielding member 330.

The liquid crystal layer 300 may include liquid crystal molecules 302 with negative dielectric anisotropy or positive dielectric anisotropy. In the description that follows, it is assumed that the liquid crystal layer 300 includes liquid crystal molecules 302 with negative dielectric anisotropy. In the absence of an electric field between the pixel electrode PE and the common electrode CE, the liquid crystal molecules 302 of the liquid crystal layer 300 may be aligned with their long axes perpendicular to the surfaces of the first and second alignment films. In an alternative exemplary embodiment, the liquid crystal molecules 302 of the liquid crystal layer 300 may be pretilted with respect to a direction of the thickness of the liquid crystal layer 300.

The first and second panels 100 and 200 will hereinafter be described one after another in further detail.

The first panel 100 includes the first substrate 105, gate lines GL1 and GL2, data lines DL1 and DL2, the pixel electrode PE, and a shielding electrode SC. The gate line GL1, the gate line GL2, or both will hereinafter be collectively referred to as a gate line GL or gate lines GL, and the data line DL1, the data line DL2, or both will hereinafter be collectively referred to as a data line DL or data lines DL.

In an exemplary embodiment, the first substrate 105 may include soda lime glass, borosilicate glass, or a plastic material with optical anisotropy, for example.

The pixel PX, which is arranged in a matrix form, may be defined on the first substrate 105. The pixel PX may be regularly arranged in various forms, such as a matrix form, a mosaic form, and the like.

A gate line GL may extend between the pixel PX and a neighboring pixel PX over the first substrate 105. A data line DL may be insulated from the gate line GL and may be disposed on the first substrate 105 where the gate line GL is provided. The data line DL may extend between the pixel PX and a neighboring pixel PX while intersecting the gate line GL.

To reduce delays in a control signal applied to the gate line GL, the gate line GL may include a metal with low resistance to have a large cross-sectional area. However, when the line width of the gate line GL is too large, the aperture ratio of the pixel PX may decrease. When the gate line GL is too thick, it may become difficult to properly provide layers over the gate line GL. Accordingly, the gate line GL may be provided to have a suitable thickness and line width for preventing a decrease in the aperture ratio of the pixel PX and at the same time, facilitating the formation of layers over the gate line GL.

A thin-film transistor ("TFT") TR may be provided in the pixel PX. More specifically, the TFT TR may be disposed in an area of overlap between a gate electrode GE, which extends from the gate line GL, and source and drain electrodes 173 and 175, which extend from the data line DL. The TFT TR may be electrically connected to the gate line GL and the data line DL. The TFT may be disposed along the gate line GL or the data line DL. The TFT may be electrically connected to the gate line GL and the data line DL and may thus output a pixel voltage applied thereto from the data line DL according to a control signal applied thereto from the gate line GL.

A sustain electrode line may be disposed on the same layer as the gate line GL. Although not specifically illustrated, the sustain electrode line may be connected to the common electrode CE in a pad area and may thus receive a common voltage. The sustain electrode line may extend in a horizontal direction and may transmit a predefined voltage such as the common voltage. The sustain electrode line may be connected to a sustain electrode, which extends in a direction of the pixel electrode PE. More specifically, the sustain electrode line may be disposed to overlap part of a horizontal edge of the pixel electrode PE, and the sustain electrode may be disposed to overlap part of a vertical edge of the pixel electrode PE.

The gate line GL and the sustain electrode line may include the same material and may be disposed on the same layer. In an exemplary embodiment, the gate line GL and the sustain electrode line may include an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), titanium (Ti), tantalum (Ta), or the like.

The gate line GL may have a multilayer structure including two conductive films (not illustrated) having different physical properties. In an exemplary embodiment, one of the two conductive films may include a low-resistivity metal, for example, an Al-based metal, an Ag-based metal, or a Cu-based metal, so as to reduce any signal delays or voltage drops in the gate line GL, for example.

A gate insulating layer 120 may be disposed on an entire surface of the first substrate 105 where the gate line GL and the sustain electrode line are provided. In an exemplary embodiment, the gate insulating layer 120 may include silicon oxide (SiOx) or silicon nitride (SiNx), for example.

A semiconductor layer 160 may be disposed on the gate insulating layer 120. The semiconductor layer 160 may be disposed to at least partially overlap the gate electrode GE. In an exemplary embodiment, the semiconductor layer 160 may include an oxide semiconductor including amorphous silicon (a-Si), polysilicon, zinc oxide (ZnO), or the like, for example.

Ohmic contacts 165 may be disposed on the semiconductor layer 160.

Data conductors including the data line DL, which has the source electrode 173 and the drain electrode 175 that is a predetermined distance apart from the source electrode 173, may be disposed on the ohmic contacts 165 and the gate insulating layer 120. The data conductors and the semiconductor layer 160 and the ohmic contacts 165, which are respectively provided below the data conductors, may be provided at the same time using a single mask.

The data line DL my include a data pad DP, which is a wide end portion of the data line DL and is provided for connecting the data line DL to another layer or an external driving circuit. The data pad DP will be described later in detail.

The data conductors may be disposed on the semiconductor layer 160. The data conductors may include the data line DL, which extends in a vertical direction to intersect the gate line GL.

The data line DL may transmit a data signal and may extend substantially in the vertical direction to intersect the gate line GL. The data line DL may include the source electrode 173, which extends toward, and is connected to, the gate electrode GE. The data line DL may also include the drain electrode 175, which faces, and is spaced from, the source electrode 173 connected to the data line DL. One end of the drain electrode 175 is surrounded by the source electrode 173, which is U-shaped. The other end of the drain electrode 175 may overlap, and may be connected to, the pixel electrode PE via a contact hole CH.

The semiconductor layer 160 may have substantially the same planar shape as the data conductors and the ohmic contacts 165 provided therebelow, except for a channel region between the source electrode 173 and the drain electrode 175. That is, the semiconductor layer 160 has parts that are exposed by not being covered by the data conductors, such as the part between the source electrode 173 and the drain electrode 175.

The data line DL may directly contact the semiconductor layer 160 and may thus provide the ohmic contacts 165. The data line DL may be provided as a single layer including a low-resistance material so as to perform the functions of an ohmic contact with respect to the semiconductor layer 160. In an exemplary embodiment, the data line DL may include Cu, Al or Ag, for example.

In an exemplary embodiment, to improve the ohmic contact properties of the data line DL with respect to the semiconductor layer 160, the data line DL may have a single- or multilayer structure including Ni, Co, Ti, Ag, Cu, Mo, Al, beryllium (Be), niobium (Nb), gold (Au), iron (Fe), selenium (Se), or Ta, for example. As examples of the multilayer structure, a double layer structure may include Ta/Al, Ta/Al, Ni/Al, Co/Al, Mo (or a Mo alloy)/Cu, Mo (or a Mo alloy)/Cu, Ti (or a Ti alloy)/Cu, TiN (or a TiN alloy)/Cu, Ta (or a Ta alloy)/Cu, or TiOx/Cu, and a triple layer structure may include Ti/Al/Ti, Ta/Al/Ta, Ti/Al/TiN, Ta/Al/TaN, Ni/Al/Ni, or Co/Al/Co.

The gate electrode GE, the source electrode 173, and the drain electrode 175 may provide the TFT TR together with the semiconductor layer 160, and the TFT TR may be disposed in the pixel PX. The channel of the TFT TR may be defined in the semiconductor layer 160 between the source electrode 173 and the drain electrode 175. According to this pixel structure in which a single TFT TR is provided in each pixel PX, the aperture ratio and transmittance of the pixel PX may both be improved, and at the same time, the side visibility of the LCD 1 may be maintained at the same level as a related-art LCD. The side visibility of the LCD 1 will be described later in detail.

A passivation layer may be disposed on the data conductors and exposed parts of the semiconductor layer 160. The passivation layer may be provided as an inorganic layer or an organic layer. In an alternative exemplary embodiment, to protect the semiconductor layer 160, the passivation layer may be provided as a double layer including a lower inorganic layer and an upper organic layer. In an alternative exemplary embodiment, the passivation layer may be provided as a triple layer including a lower inorganic layer 180p, an organic layer 180, which is disposed on the lower inorganic layer 180p, and an upper inorganic layer 180q, which is disposed on the organic layer 180. A color filter 1800 may be used as an organic layer included in the passivation layer. In an alternative exemplary embodiment, to address the problems with parasitic capacitance and provide a planar surface on the color filter 1800, an additional organic layer may be provided on the color filter 1800.

In an exemplary embodiment, the lower inorganic layer 180p may be disposed below the data conductors and the exposed parts of the semiconductor layer 160 and may include an inorganic insulating material such as silicon nitride or silicon oxide, for example. The lower inorganic layer 180p will hereinafter be referred to as the lower passivation layer 180p, and the upper inorganic layer 180q will hereinafter be referred to as the upper passivation layer 180q.

The organic layer 180, which is provided on the lower passivation layer 180p, may also be used as a passivation layer. The color filter 1800 may be used as the organic layer 180. In an alternative exemplary embodiment, the color filter 1800 may be provided, and an organic layer 180, which is transparent, may be additionally provided on the color filter 1800. That is, the organic layer 180 additionally provided on the color filter 1800 may be optional. FIGS. 1 to 3 illustrate an exemplary case in which the organic layer 180 is additionally provided.

In an exemplary embodiment, the color filter 1800 may extend in the vertical direction along the data line DL, and may display, for example, one of three primary colors, i.e., red, green, and blue. The color filter 1800 may be disposed above the data line DL to overlap the data line DL. An organic layer 185 for planarization may be additionally provided on the color filter 1800.

The upper passivation layer 180q may be disposed on the color filter 1800 and parts of the lower passivation layer 180p exposed through openings. The upper passivation layer 180q may prevent the color filter 1800 from being lifted off the underlying layers and may also prevent the liquid crystal layer 300 from being contaminated by an organic material such as a solvent from the color filter 1800, thereby preventing defects such as afterimages that may occur during the driving of the LCD 1. In an exemplary embodiment, the upper passivation layer 180q may include an inorganic insulating material such as silicon nitride or silicon oxide, or an organic material.

The contact hole CH, which connects the end of the drain electrode 175 and the end of the pixel electrode PE, may be defined through the lower passivation layer 180p, the color filter 1800, and the upper passivation layer 180q.

In an exemplary embodiment, the pixel electrode PE may include a transparent conductive material such as indium tin oxide ("ITO"), indium gallium zinc oxide ("IGZO"), indium zinc oxide ("IZO"), or the like. The pixel electrode PE may generate an electric field together with the common electrode CE, which is included in the second panel 200, using a voltage received from the drain electrode 175, to which a data voltage is applied, and may thus rotate the liquid crystal molecules 302 in the liquid crystal layer 300, which is disposed between the first and second panels 100 and 200.

The pixel electrode PE may be provided in each of the data lines PX, which are defined by the gate line GL and the data line DL. The pixel electrode PE may receive a data voltage via the TFT TR, which is controlled by a gate signal. In other words, the pixel electrode PE, which is arranged as illustrated in FIG. 1, may be connected to the drain electrode 175 via the contact hole CH and may receive a data voltage from the drain electrode 175.

The LCD 1 may also include the shielding electrode SC, which is disposed between the pixel electrode PE and a neighboring pixel electrode PE to overlap the data line DL. The LCD 1 may also include the light-shielding member 330, which is disposed along the gate line GL, but the invention is not limited thereto. That is, the light-shielding member 330 may be disposed in a region where the data line DL and the TFT TR are provided. In an exemplary embodiment, the light-shielding member 330 may include a material which blocks light, such as Cr.

The shielding electrode SC may be provided with a similar voltage to a voltage applied to the common electrode CE and may thus prevent the movement of liquid crystal molecules 302 disposed thereon, thereby providing a light-shielding area. In an alternative exemplary embodiment, the shielding electrode SC may be provided with a different voltage from the common electrode CE, thereby improving the force of control of liquid crystal molecules 302 in an area of the edges of the pixel electrode PE.

The shape of the pixel PX of the LCD 1 will hereinafter be described with reference to FIGS. 1 to 3. Referring to FIGS. 1 to 3, the pixel PX may include the pixel electrode PE, which is connected to the TFT TR, and the shielding electrode SC, which is disposed to overlap the data line DL.

The LCD 1 may also include a first shielding contact hole SCH-1, which connects a data pad line DPL that is an extension of the data line DL and a shielding pad line SCPL that is an extension of the shielding electrode SC.

The shielding electrode SC and the shielding pad line SCPL may be disposed on the organic layer 180, and the upper passivation layer 180q may be disposed on the shielding electrode SC and the shielding pad line SCPL. The first shielding contact hole SCH-1, which partially exposes the shielding pad line SCPL therethrough, may be provided by partially removing the upper passivation layer 180q from a non-display area.

The formation of the first shielding contact hole SCH-1 and the shielding pad line SCPL will hereinafter be described. First, the data line DL, the data pad line DPL, which is an extension of the data line DL, and the data pad DP, which is a wide end portion provided at the end of the data pad line DPL, may be provided in a display area to extend to the non-display area.

The lower passivation layer 180p, the color filter 1800, and the organic layer 180 may be provided on the substrate where the data line DL and the data pad line DPL are provided. The shielding electrode SC may be provided on the organic layer 180. In the display area, the shielding electrode SC may be provided on the organic layer 180, and in the non-display area, the shielding pad line SCPL, which is an extension of the shielding electrode SC, may be provided. In an exemplary embodiment, the shielding electrode SC and the shielding pad line SCPL may include one of IZO, ITO, IGZO, and a combination thereof.

The upper passivation layer 180q may be provided on the substrate where the shielding electrode SC and the shielding pad line SCPL are provided.

The contact hole CH may be defined, and at the same time, the first shielding contact hole SCH-1 may be defined during the formation of a pad contact hole PCH on the data pad DP. In an exemplary embodiment, the first shielding contact hole SCH-1 may be defined using, for example, a halftone mask.

When providing a pad portion P, the shielding pad line SCPL, and the pixel electrode PE, the data pad line DPL may be connected to the shielding pad line SCPL via the first shielding contact hole SCH-1. During the formation of the pad portion P, a pad line PAL, which is an extension of the pad portion P, may also be provided.

The pad line PAL may be provided even in an area where the pad line PAL may overlap part of the shielding pad line SCPL. That is, an area of overlap between the pad line PAL and the shielding pad line SCPL may become a connecting area between the shielding electrode SC and the data line DL. The shielding pad line SCPL may be provided to extend the shielding electrode SC, and thus, a voltage may be provided to the shielding electrode SC.

The data line DL may include the source electrode 173 and the drain electrode 175, and due to the channel defined in the semiconductor layer 160 between the source electrode 173 and the drain electrode 175, a data voltage applied to the data line DL may be applied to the pixel electrode PE via a turned-on TFT TR. A voltage different from the data voltage applied to the data line DL may be applied to the pixel electrode PE.

The shielding pad line SCPL may be connected to the data pad line DPL. That is, the shielding pad line SCPL and the shielding electrode SC may include an oxide with a higher resistivity than the material of the data line DL. In an exemplary embodiment, the shielding pad line SCPL and the shielding electrode SC may include one of IZO, ITO, IGZO, and a combination thereof.

Due to the presence of a high-resistivity oxide conductor, a voltage drop may occur in shielding pad line SCPL and the shielding electrode SC, which are connected to the data pad line DPL.

Accordingly, a voltage applied to the pixel electrode PE may differ from a voltage applied to the shielding electrode SC.

In response to the voltage applied to the pixel electrode PE differing from the voltage applied to the shielding electrode SC, a potential difference may be generated between the shielding electrode SC and the pixel electrode PE. The potential difference may generate an electric field between the pixel electrode PE and the shielding electrode SC and may thus drive liquid crystal molecules 302 in an area between the pixel electrode PE and the shielding electrode SC. In an alternative exemplary embodiment, an electric field may be relatively weakened near the shielding electrode SC, and the force of control of the liquid crystal molecules 302 may be strengthened in an area between the pixel electrode PE and the shielding electrode SC.

Therefore, by adjusting the voltage applied to the pixel electrode PE and the voltage that the shielding electrode SC is charged with, the liquid crystal molecules 302 may be driven such that an image viewed from a side of the LCD 1 may become as similar as possible to an image viewed from the front of the front of the LCD 1. As a result, the transmittance and the side visibility of the LCD 1 may be improved.

In the exemplary embodiment, the shielding electrode SC and the shielding pad line SCPL include an oxide which may cause a voltage drop to apply different voltages to the shielding electrode SC and the data line DL, but the invention is not limited thereto. That is, in an alternative exemplary embodiment, the shielding electrode SC and the shielding pad line SCPL may be separated from the data line DL, and an independent integrated circuit ("IC") may be connected to the shielding electrode SC to apply a voltage different from the voltage applied to the data line DL to the shielding electrode SC and the shielding pad line SCPL. Various methods other than those set forth herein may be used to apply different voltages to the data line DL and the shielding electrode SC.

As mentioned above, by providing the shielding electrode SC on the edge of the pixel electrode PE, the behavior of liquid crystal molecules 302 on the edge of the pixel electrode PE may be controlled. As a result, the transmittance on the edge of the pixel electrode PE may be improved.

The second panel 200 includes the second substrate 210, which faces the first substrate 105, and the common electrode CE. In an exemplary embodiment, the common electrode CE may be disposed on the second substrate 210, which may include a transparent glass or plastic material, for example.

The light-shielding member 330 and the color filter 1800 may be disposed in the first panel 100. In an alternative exemplary embodiment, the light-shielding member 330 and the color filter 1800 may be selectively disposed in the second panel 200. More specifically, the light-shielding member 330, the color filter 1800, an overcoat layer, and the second alignment film may be disposed on the second substrate 210. In the exemplary embodiment, the color filter 1800 and the light-shielding member 330 are provided in the first panel 100.

In response to the color filter 1800 and the light-shielding member 330 being provided on the first substrate 105, problems that may occur in a curved display device, such as misalignment of lines, may be prevented, and disclination lines, which may cause misalignment of the liquid crystal molecules 302, may be prevented from being generated when determining the alignment direction of the liquid crystal molecules 302 with the use of both the first and second alignment films.

The alternative exemplary embodiment in which the light-shielding member 330, the color filter 1800, an overcoat layer, and the second alignment film are selectively provided on the second substrate 210 will hereinafter be described. The color filter 1800 may be disposed on the second substrate 210, and the light-shielding member 330 may be disposed along the boundary between the color filter 1800 and a neighboring color filter 1800. The color filter 1800 may serve as a filter transmitting light of a particular wavelength only therethrough, and the light-shielding member 330, which is also referred to as a black matrix, may prevent light leakage and may also prevent the mixing of colors from the color filter 1800 and the neighboring color filters 1800.

An overcoat layer 220 and the second alignment film may be selectively provided in the second panel 200. The overcoat layer 220 may be disposed on the entire surface of the second substrate 210 where the color filter 1800 and the light-shielding member 330 are provided. In an exemplary embodiment, the overcoat layer 220 may include an insulating material and may provide a planar surface. In another exemplary embodiment, the overcoat layer 220 may not be provided.

The common electrode CE may be disposed on the overcoat layer 220. The second alignment film may be disposed on the common electrode CE, and may be provided as a vertical alignment film. In another exemplary embodiment, the second alignment film may not be provided. The cutout 280 may be defined in the common electrode CE. The cutout 280 may control the alignment of the liquid crystal molecules 302. Due to the cutout 280, a plurality of domains may be defined in the pixel PX, which will be described later.

Figure 4:
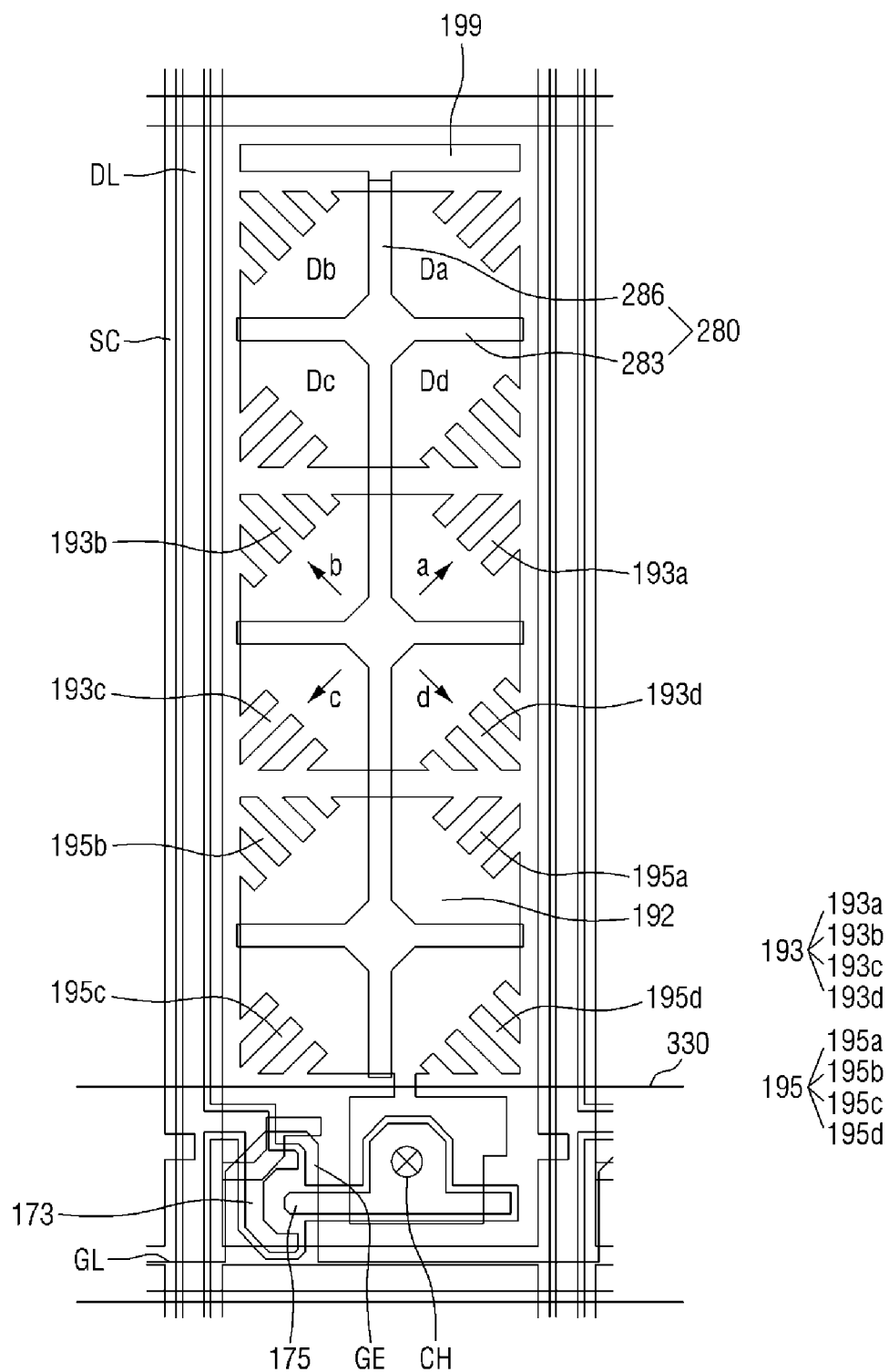
FIG. 4 is a plan view of a comparative example of an LCD.
Figure 5:
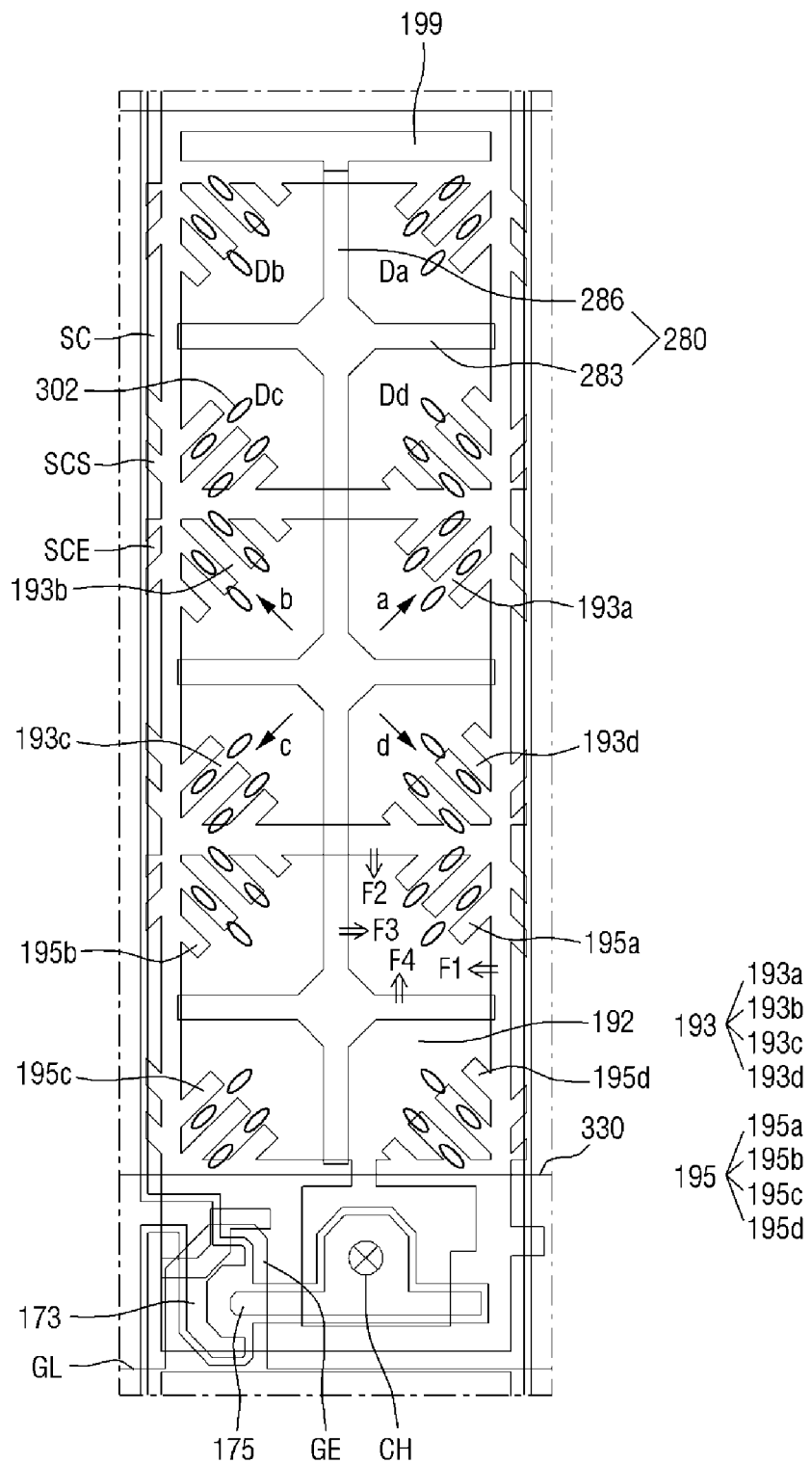
FIG. 5 is a plan view illustrating the driving of liquid crystal molecules in the LCD of FIG. 1.
Figure 6:
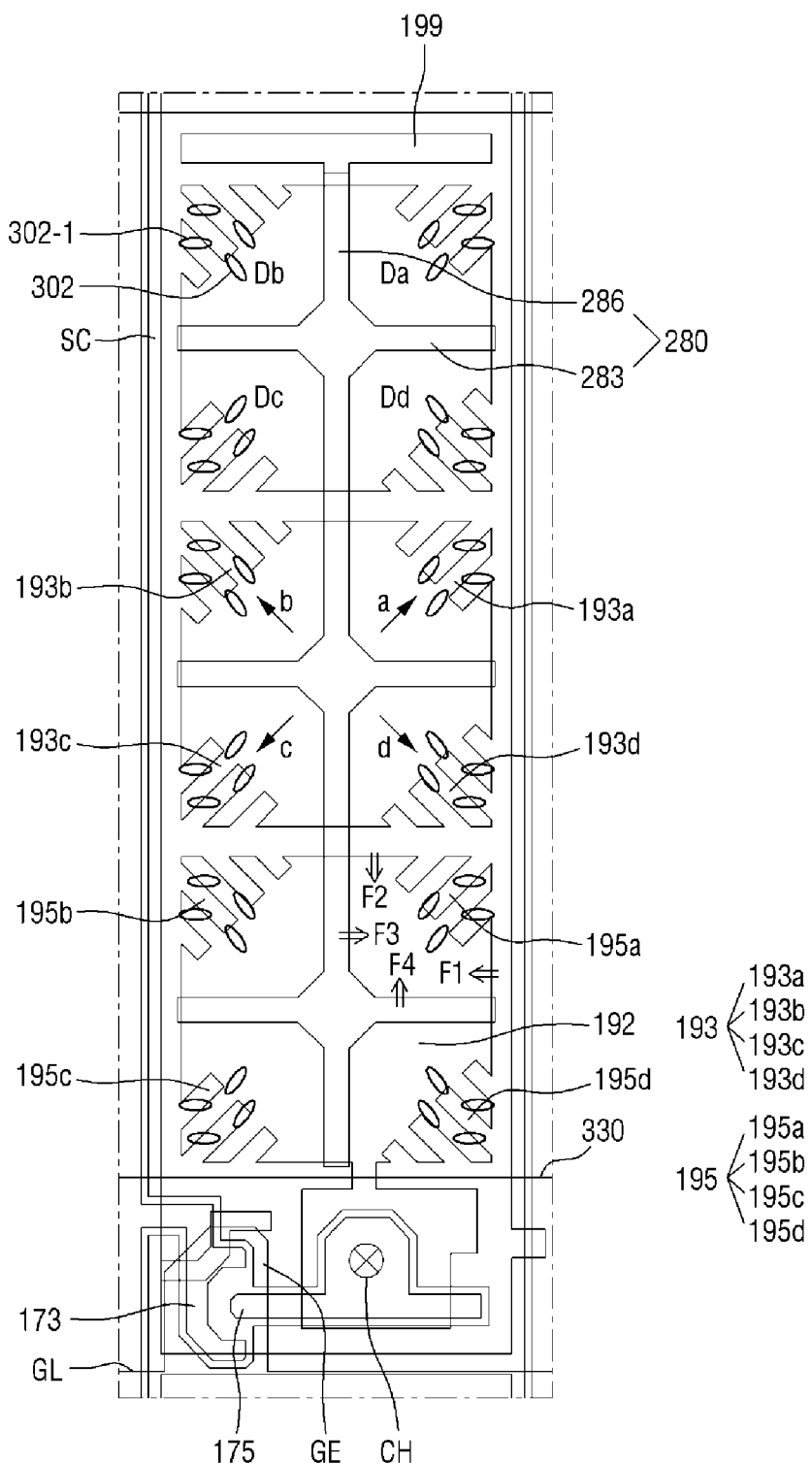
FIG. 6 is a plan view illustrating the comparative example of the driving of liquid crystal molecules in the LCD.

FIG. 3 is an enlarged view of a pixel of the LCD 1 of FIG. 1, FIG. 4 is a plan view of an LCD according to a comparative example, FIG. 5 is a plan view illustrating the driving of liquid crystal molecules in the LCD 1 of FIG. 1, and FIG. 6 is a plan view illustrating the driving of liquid crystal molecules in the LCD according to the comparative example. In FIGS. 1 to 6, like reference numerals refer to like elements, and any repetitive description will be omitted for convenience.

The pixel electrode PE will hereinafter be described in further detail with reference to FIGS. 1 to 3. In an exemplary embodiment, referring to FIG. 3, the pixel electrode PE may be substantially rectangular, for example. The pixel electrode PE may be disposed to correspond to, and cover the pixel PX and the common electrode CE which faces the pixel electrode PE and in which the cutout 280 is defined.

In response to a potential difference being provided between the pixel electrode PE and the common electrode CE, which are provided in the first and second panels 100 and 200, respectively, to generate an electric field, the liquid crystal molecules 302 in the liquid crystal layer 300, which is disposed between the first and second panels 100 and 200, may be aligned in such a manner that their long axes may be perpendicular to the electric field. The degree of the polarization of incident light may vary depending on the degree to which the liquid crystal molecules 302 are tilted. Variations in the polarization of the incident light may result in variations in the transmittance of the LCD 1, caused by the first and second polarizing plates 140 and 240, and as a result, the LCD 1 may be able to display an image.

To improve the viewing angle of the LCD 1, which displays an image, the pixel electrode PE and the common electrode CE may be patterned so as to define a plurality of domains.

More specifically, for example, the pixel electrode PE may include a whole electrode 192, which is disposed in the middle of the pixel electrode PE, and branch electrodes 193a, 193b, 193c, and 193d, which are separated by slit patterns 195a, 195b, 195c, and 195d that are provided in the pixel PX. The slit patterns 195a, 195b, 195c, and 195d may adjust the direction of an electric field. The cutout 280 defined in the common electrode CE may also adjust the direction of an electric field.

Since the pixel electrode PE and the common electrode CE are both patterned, the pixel PX may be divided into a plurality of domains in which the liquid crystal molecules 302 having different average liquid crystal azimuths are oriented in different directions.

As illustrated in FIG. 3, the pixel PX may include four domains, i.e., first, second, third, and fourth domains Da, Db, Dc, and Dd, which are defined by a horizontal cutout portion 283 and a vertical cutout portion 286 of the common electrode CE.

Assuming that an average liquid crystal azimuth is an angle corresponding to the average of the alignment directions of liquid crystal molecules 302 in each of the first, second, third, and fourth domains Da, Db, Dc, and Dd and liquid crystal molecules 302 having the average liquid crystal azimuth are average liquid crystal molecules 302, the average liquid crystal molecules 302 may be tilted, in the presence of an electric field, in a direction corresponding to the sum of a vector defined by the electric field in the first, second, third, and fourth domains Da, Db, Dc, and Dd and a vector defined by collisions between the liquid crystal molecules 302.

That is, the liquid crystal molecules 302 may provide azimuths similar to directions in which the edges of the pixel PX extend at the intersection between the horizontal and vertical cutout portions 283 and 286. In each of the first, second, third, and fourth domains Da, Db, Dc, and Dd, the liquid crystal molecules 302 may be aligned to have an average liquid crystal azimuth angle corresponding to an arrow a, b, c, or d in a plan view.

More specifically, the liquid crystal molecules 302 may be aligned almost in parallel to four diagonal directions from the four corners of the pixel electrode PE to the center of the cutout 280 of the common electrode CE, which is cross-shaped.

Accordingly, the directors of the liquid crystal molecules 302 may be aligned and tilted in the first, second, third, and fourth domains Da, Db, Dc, and Dd in a total of four directions in the presence of an electric field.

The pixel PX is divided into a total of four regions by the horizontal and vertical cutout portions 283 and 286 of the common electrode CE, and an electric field is provided in a total of four directions in the first, second, third, and fourth domains Da, Db, Dc, and Dd by field-generating electrodes. Accordingly, the liquid crystal molecules 302 in the pixel PX may be tilted in a total of four directions. By varying the direction in which the liquid crystal molecules 302 are tilted from area to area, the reference viewing angle of the LCD 1 may be improved.

In an exemplary embodiment, the pixel PX may be divided into four domains, i.e., the first, second, third, and fourth domains Da, Db, Dc, and Dd, by the horizontal and vertical cutout portions 283 and 286 of the common electrode CE, and the width, e.g., a length of vertical cutout portion 286 taken along a direction parallel to a direction in which the gate line GL extends and a length of the horizontal cutout portion 283 taken along a direction parallel to a direction in which the data line DL extends, of the cutout 280, which includes the horizontal and vertical cutout portions 283 and 286, may be about 2 μm to about 5 μm for example. To improve the force of control of the liquid crystal molecules 302, the width of the cutout 280 may be adjusted.

In an exemplary embodiment, in response to the width of the cutout 280 being about 2 μm to about 5 μm the visibility of the LCD 1 may be improved without compromising the transmittance of the pixel PX, for example. In response to the width of the cutout 280 being about 5 μm or less, a fringe field may be prevented from excessively increasing along the boundaries between the first and fourth domains Da and Dd and between the second and third domains Db and Dc, and thus, decreases in the visibility and transmittance of the LCD 1 may be minimized. Also, in response to the width of the cutout 280 being about 5 μm or less, any decrease in the aperture ratio of the pixel PX that may be caused in response to the liquid crystal molecules 302 not being sufficiently tilted in the area where the cutout 280 is provided may be reduced.

An open portion may be provided at the intersection between the horizontal and vertical cutout portions 283 and 286. The open portion may have a larger width than the horizontal and vertical cutout portions 283 and 286. To adjust the intensity of an electric field in the pixel PX, the cutout 280 may become thicker from the edges of the pixel PX to the open portion.

The first, second, third, and fourth domains Da, Db, Dc, and Dd, which are defined by the horizontal and vertical cutout portions 283 and 286 of the common electrode CE, may divide the pixel electrode PE. The horizontal cutout portion 283 may horizontally divide the pixel electrode PE, thereby defining upper and lower domains, and the vertical cutout 286 may vertically divide the pixel electrode PE, thereby defining left and right domains.

The pixel electrode PE may include the whole electrode 192, which is disposed in the middle of the pixel PX. In an exemplary embodiment, the whole electrode 192 may be, for example, a rectangular electrode. The pixel electrode PE may also include a capacitance electrode 199, which is disposed near one of the edges of the whole electrode 192, i.e., an edge part of the pixel PX, and a connecting electrode, which connects the capacitance electrode 199 and the whole electrode 192. More specifically, the whole electrode 192 and the capacitance electrode 199 may be spaced from each other, and parts of the whole electrode 192 and the capacitance electrode 199 may be connected by the connecting electrode.

The capacitance electrode 199 may be disposed in parallel to the horizontal edges of the whole electrode 192, which is rectangular, and may overlap the sustain electrode line disposed therebelow.

The slit patterns 195*a*, 195*b*, 195*c*, and 195*d*, which are respectively disposed at the corners of the whole electrode 192 of the pixel PX and are defined by removing parts of the pixel electrode PE, may be defined in the first panel 100 which includes the pixel electrode PE. The slit patterns 195*a*, 195*b*, 195*c*, and 195*d* may be defined by removing parts of the pixel electrode PE to expose the insulating layer disposed below the pixel electrode PE. The slit patterns 195*a*, 195*b*, 195*c*, and 195*d* may include first, second, third, and fourth slit patterns 195*a*, 195*b*, 195*c*, and 195*d*.

The shielding electrode SC may be disposed on the left side of the second and third slit patterns 195*b* and 195*c* and on the right side of the first and fourth slit patterns 195*a* and 195*d*.

For example, the shielding electrode SC may be disposed along, and spaced from, the sides of the second and third domains Da and Db. In an exemplary embodiment, the shielding electrode SC may be spaced from the second and third domains Db and Dc by a distance of about 3 μm to about 5 μm.

More specifically, the second and third slit patterns 195*b* and 195*c* may be disposed in the second and third domains Db and Dc, respectively. Liquid crystal control slits SCS may be provided on the shielding electrode SC in an area corresponding to each of the second and third slit patterns 195*b* and 195*c*. The liquid crystal control slits SCS may be defined by removing parts of the shielding electrode SC so as to expose the insulating layer below the pixel electrode PE. That is, the liquid crystal control slits SCS of the shielding electrode SC may be disposed to be spaced from the second and third slit patterns 195*b* and 195*c* by a distance of about 3 μm to about 5 μm, for example.

The liquid crystal control slits SCS may be arranged in a staggered manner with respect to the second and third slit patterns 195*b* and 195*c*. In response to the liquid crystal control slits SCS being in a staggered arrangement with the second and third slit patterns 195*b* and 195*c*, the liquid crystal control electrodes SCE may also be in a staggered arrangement with second branch electrodes 193*b* and third branch electrodes 193*c*, and the liquid crystal molecules 302 may be properly driven in an area corresponding to each of the gaps among the liquid crystal control electrodes SCE, the second branch electrodes 193*b*, and the third branch electrodes 193*c*, thereby improving the transmittance of the pixel PX. The driving of the liquid crystal molecules 302 in the area corresponding to each of the gaps among the liquid crystal control electrodes SCE, the second branch electrodes 193*b*, and the third branch electrodes 193*c* will be described later in detail.

FIG. 3 illustrates a plan view of the pixel PX of the LCD 1 in which the liquid crystal electrodes SCE are provided on the shielding electrode SC, and FIG. 5 illustrates the driving of the liquid crystal molecules 302 in the pixel PX of FIG. 3. FIG. 4 illustrates a pixel of an LCD according to a comparative example, and FIG. 6 illustrates the driving of liquid crystal molecules in a pixel of the LCD of FIG. 4. FIGS. 4 and 6 illustrate a case in which the same voltage as a pixel voltage is applied to the shielding electrode of the LCD according to the comparative example.

In response to a voltage being applied between the pixel electrode PE and the common electrode CE, the behavior and refractive index of the liquid crystal molecules 302 may vary, and as a result, the LCD 1 may realize a gray image.

The LCD 1 achieves a high contrast ratio because of its excellent "dark" characteristics, but the transmittance of the LCD 1 may vary considerably depending on a direction from which the LCD 1 is viewed because of the LCD 1 using negative liquid crystal molecules. That is, the transmittance of the LCD 1 may differ from direction to direction and thus, the viewing angle of the LCD 1 may deteriorate.

To improve the viewing angle of the LCD 1, electrode patterns may be provided in each of the first and second panels 100 and 200, as discussed above with reference to FIGS. 1 and 2, so as to define a plurality of domains that differ from one another in the direction of the movement of the liquid crystal molecules 302. The electrode patterns may be, for example, the pixel electrode PE or the common electrode CE.

By defining a plurality of domains, i.e., the first, second, third, and fourth domains Da, Db, Dc, and Dd, differences in the refractive index of the liquid crystal layer 300 between different viewing directions may be minimized, and the visibility of the LCD 1 may be improved. However, the gray curve of the LCD 1 may be distorted on the sides of the LCD 1.

In a pixel structure having the first, second, third, and fourth domains Da, Db, Dc, and Dd, the optical efficiency may decrease on the edges of the pixel PX due to disclination lines that may be provided in response to some liquid crystal molecules 302 being driven in a direction corresponding to the polarization axis of the first and second polarizing plates 140 and 240 during the realization of a bright state or a dark state.

To address the above-described problems, the distortion of the gray curve of the LCD 1 may be reduced by changing the patterns of the pixel electrode PE and the shielding electrode SC. By changing the patterns of the pixel electrode PE and the shielding electrode SC, differences in transmittance may be reduced, and the distortion of the gray curve of the LCD 1 may be minimized so as to improve visibility.

The driving of the liquid crystal molecules 302 for minimizing the distortion of the gamma curve of the LCD 1 will hereinafter be described.

The driving of the liquid crystal molecules 302 in the pixel PX and a direction in which an electric field is generated in the pixel PX will hereinafter be described with reference to FIGS. 5 and 6. Referring to FIGS. 5 and 6, an electric field may be generated in the liquid crystal layer 300 (refer to FIG. 2) between the pixel electrode PE and the common electrode CE by applying a data voltage and a common voltage to the pixel electrode PE and the common electrode CE, respectively.

The liquid crystal molecules 302 in the liquid crystal layer 300 may respond to the electric field, and as a result, fringe fields may be generated due to the cutout 280 of the common electrode CE and the pixel electrode PE. First, second, third, and fourth horizontal field components in first, second, third, and fourth directions, respectively, which drive the liquid crystal molecules 302 with the fringe fields, will hereinafter be referred to as first, second, third, and fourth horizontal fields F1, F2, F3, and F4, respectively. Also, an electric field oriented from the right of the pixel PX to the center of the pixel PX, an electric field oriented from the top to the center of the pixel PX, an electric field oriented from the left to the center of the pixel PX, and an electric field oriented from the bottom to the center of the pixel PX will hereinafter be referred to as the first, second, third, and fourth horizontal fields F1, F2, F3, and F4, respectively, regardless of in which of the first, second, third, and fourth domains Da, Db, Dc, and Dd are provided.

The directors of the liquid crystal molecules 302 may be tilted by each of the first and second horizontal fields F1 and F2, which are oriented from the edges to the center of the pixel PX, and each of the third and fourth horizontal fields F3 and F4, which are oriented from the cross-shaped cutout 280 to the edges of the pixel PX, to be substantially parallel to the polarization axis of the first and second polarizing plates 140 and 240. As a result, in the pixel PX, the liquid crystal molecules 302 may be tilted in a total of four directions.

More specifically, first directors and second directors of the liquid crystal molecules 302 may be provided in areas adjacent to the edges of the pixel electrode PE, to be perpendicular to the edges of the pixel electrode PE. Third directors and fourth directors of the liquid crystal molecules 302 may be provided in areas near the cutout 280 to be perpendicular to the edges of the cutout 280.

The first directors, second directors, third directors, and fourth directors of the liquid crystal molecules 302 may be primarily determined by the fringe fields provided by the edges of the pixel electrode PE and the cutout 280 of the common electrode CE. Due to the fringe fields F1 through F4, the liquid crystal molecules 302, which are primarily driven in a direction substantially parallel to the polarization axis of the first and second polarizing plates 140 and 240, may be provided as the first directors, the second directors, the third directors, and the fourth directors.

The liquid crystal molecules 302 driven as the first directors, the second directors, the third directors, and the fourth directors may meet one another in the pixel PX and may thus be secondarily aligned in a direction in which distortion may be minimized. The direction in which the first directors, the second directors, the third directors, and the fourth directors are secondarily aligned may be a direction corresponding to the sum of the vectors of the first directors, the second directors, the third directors, and the fourth directors.

Accordingly, in each of the first, second, third, and fourth domains Da, Db, Dc, and Dd, an average liquid crystal azimuth may be provided in a direction similar to the direction a, b, c, or d, as illustrated in FIGS. 3 and 4. That is, the liquid crystal molecules 302 may be aligned to have different average liquid crystal azimuths in the first, second, third, and fourth domains Da, Db, Dc, and Dd.

As a result of the aforementioned driving of the liquid crystal molecules 302, different average liquid crystal azimuths may be provided in the first, second, third, and fourth domains Da, Db, Dc, and Dd. Referring to FIGS. 5 and 6, in the first domain Da of the pixel PX, the directors of the liquid crystal molecules 302 may be diagonally aligned along an upper right direction relative to the horizontal cutout portion 283, thereby providing an average liquid crystal azimuth corresponding to the direction a.

In the second domain Db of the pixel PX, the directors of the liquid crystal molecules 302 may be diagonally aligned along an upper left direction relative to the horizontal cutout portion 283, thereby providing an average liquid crystal azimuth corresponding to the direction b.

In the third domain Dc of the pixel PX, the directors of the liquid crystal molecules 302 may be diagonally aligned along a lower left direction relative to the horizontal cutout portion 283, thereby providing an average liquid crystal azimuth corresponding to the direction c.

In the fourth domain Dd of the pixel PX, the directors of the liquid crystal molecules 302 may be diagonally aligned along a lower right direction relative to the horizontal cutout portion 283, thereby providing an average liquid crystal azimuth corresponding to the direction d.

Accordingly, the liquid crystal molecules 302 may be controlled to be aligned in different directions in different domains of the pixel PX, and thus, the side visibility of the LCD 1 may be improved.

In the LCD 1 of FIGS. 3 and 5, the shielding electrode SC including the liquid crystal control electrodes SCE and the pixel electrode PE including the slit patterns 195a, 195b, 195c, and 195d are disposed adjacent to each other. A data drop occurs in the shielding electrode SC, and a shielding voltage, which is lower than a data voltage, is applied to the shielding electrode SC. A pixel voltage is applied to the pixel electrode PE. Accordingly, an electric field may be generated to be relatively weakened near the shielding electrode SC, and as a result, the force of control of the liquid crystal molecules 302 may be strengthened between the slit patterns 195a, 195b, 195c, and 195d of the pixel electrode PE. In an alternative exemplary embodiment, horizontal fields (or fringe fields) may be generated between the pixel electrode PE and the shielding electrode SC.

The force of control of the liquid crystal molecules 302 may be strengthened in an area where the slit patterns 195a, 195b, 195c, and 195d are provided. In each of the area where the slit patterns 195a, 195b, 195c, and 195d are provided, the liquid crystal molecules 302 may be driven in a similar direction to the direction of a corresponding average liquid crystal azimuth under the influence of horizontal fields.

Therefore, in response to a lower voltage than the pixel voltage being applied to the shielding electrode SC, an electric field may be relatively weakened in the shielding electrode SC, and as a result, the force of control of the liquid crystal molecules 302 may be strengthened in the area where the slit patterns 195a, 195b, 195c, and 195d are provided. In an exemplary embodiment, a voltage which is lower than the pixel voltage by about −1.5 V to about −2.5 V may be applied to the shielding electrode SC, for example. More specifically, a voltage which is lower than the pixel voltage by about −2 V may be applied to the shielding electrode SC.

Accordingly, even in areas where the slit patterns 195a, 195b, 195c, and 195d of the pixel electrode PE and where the liquid crystal control electrodes SCE of the shielding electrode SC are provided and in an area near the liquid crystal control slits SCS, the liquid crystal molecules 302 may be aligned in a similar manner to the average liquid crystal azimuth in each of the first, second, third, and fourth domains Da, Db, Dc, and Dd, and thus, the transmittance and the visibility of the LCD 1 may be improved.

In the LCD of FIGS. 4 and 6, the pixel voltage is applied not only to the pixel electrode PE, but also to the shielding electrode SC, which is disposed near the pixel electrode PE, and as a result, no fringe fields may be provided along the edges of the pixel electrode PE. Thus, the force of control of the liquid crystal molecules 302 may be weakened along the edges of the pixel electrode PE.

In the area of the edges of the pixel electrode PE, the liquid crystal molecules 302 may be driven in the same direction as the polarization axis of the first and second polarizing plates 140 and 240. More specifically, liquid crystal molecules 302-1, which are driven in the same direction as the polarization axis of the first and second polarizing plates 140 and 240, may need liquid crystal molecules 302 that they may collide with to be primarily driven by a horizontal field and then secondarily tilted. However, in the area of the edges of the pixel electrode PE, there may be no liquid crystal molecules 302 that the liquid crystal molecules 302-1 may collide with. Accordingly, the liquid crystal molecules 302 in the area of the edges of the pixel electrode PE may be driven solely under the influence of a horizontal field, and may thus be aligned in the same direction as the polarization axis of the first and second polarizing plates 140 and 240.

However, the transmittance of visibility of the LCD of FIGS. 4 and 6 may be degraded due to the presence of the liquid crystal molecules 302-1, which are tilted in the same direction as the polarization axis of the first and second polarizing plates 140 and 240, i.e., vertically or horizontally tilted.

The LCD 1 may adjust the tilting of the liquid crystal molecules 302 in each average liquid crystal molecule azimuth direction by defining vectors for secondarily aligning the liquid crystal molecules in an area of the edges of the pixel PX. That is, the LCD 1 may prevent any display quality degradation that may be caused by an irregular arrangement of the liquid crystal molecules 302 in the area of the edges of the pixel PX.

Figure 7:
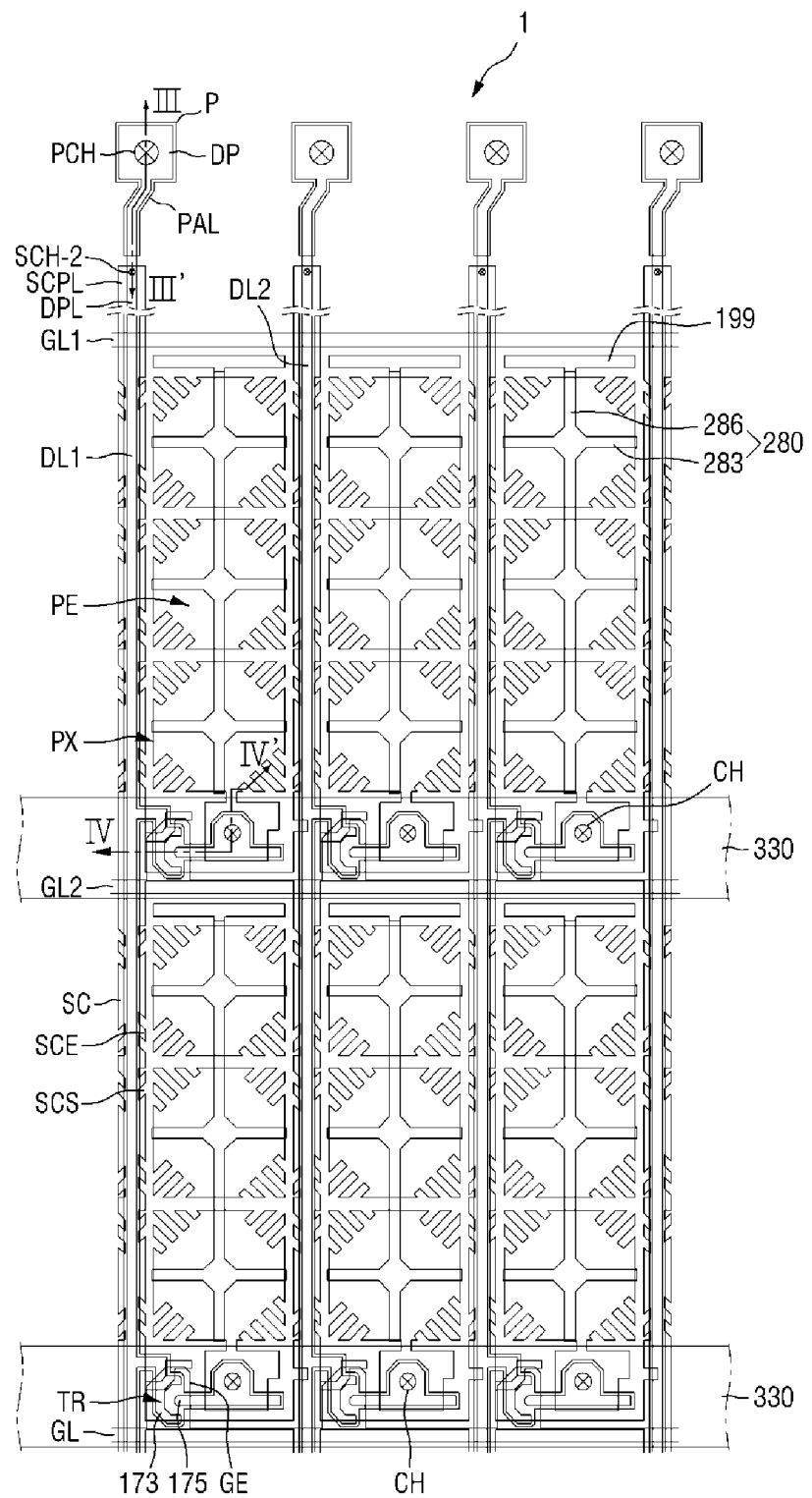
FIG. 7 is a plan view of another exemplary embodiment of an LCD according to the invention.
Figure 8:
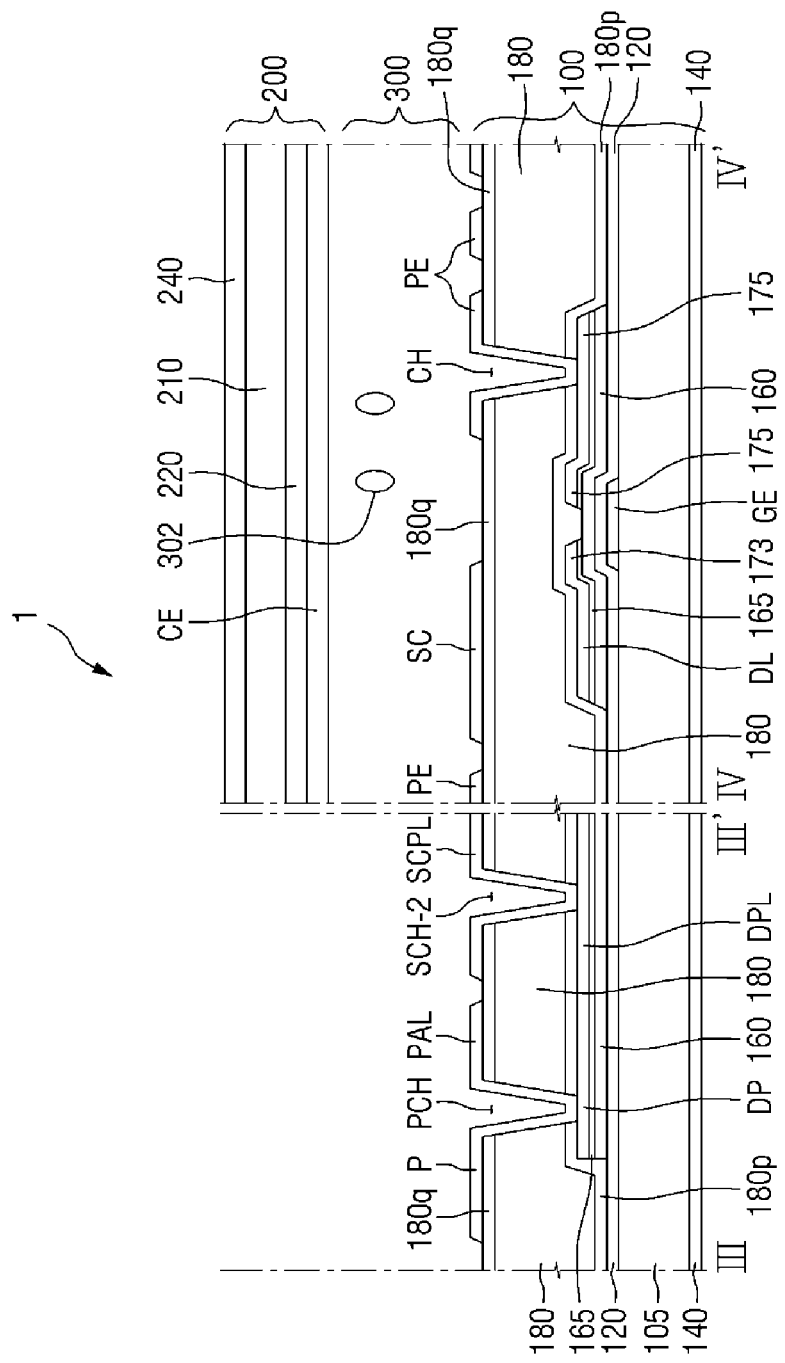
FIG. 8 illustrates cross-sectional views taken along lines III-III' and VI-VI' of FIG. 7.

FIG. 7 is a plan view of an LCD according to another exemplary embodiment of the invention, and FIG. 8 illustrates cross-sectional views taken along lines III-III' and VI-VI' of FIG. 7. In FIGS. 1 to 8, like reference numerals refer to like elements, and any repetitive description will be omitted for convenience.

Referring to FIGS. 7 and 8, an LCD 1 according to another exemplary embodiment of the invention may include a data line, which is disposed in a display area, and a shielding electrode SC, which is disposed to overlap the data line DL.

The LCD 1 may also include a second shielding contact hole SCH-2, which connects a data pad line DPL that is provided in a non-display area as an extension of the data line DL and a shielding pad line SCPL that is an extension of the shielding electrode SC.

The shielding electrode SC may include the shielding pad line SCPL, which extends into the non-display area, and the shielding pad line SCPL may be disposed near a pad portion P. The shielding pad line SCPL and the pad portion P may be spaced from each other, and different voltages may be applied to the shielding pad line SCPL and the pad portion P. The second shielding contact hole SCH-2 may be disposed in an area of the shielding pad line SCPL near the pad portion P.

The shielding pad line SCPL and the data pad line DPL may be connected via the second shielding contact hole SCH-2. The data pad DP, which is disposed at the end of the data pad line DPL, may be connected to the pad portion P via a pad contact hole PCH.

The pad contact hole PCH and the second shielding contact hole SCH-2 may be provided using a single mask. The shielding pad line SCPL, a pixel electrode PE, and the pad portion P may be provided using the same material, and patterns may be provided using a single mask. Accordingly, the fabrication of the LCD 1 may be simplified.

A data voltage may be applied to the data line DL via the pad portion P, and a shielding voltage, which is lower than the data voltage, may be provided to the shielding electrode SC via the second shielding contact hole SCH-2.

In other words, the shielding pad line SCPL may be connected to the data pad line DPL via the second shielding contact hole SCH-2, and the data voltage, which is provided by the pad portion P, may be provided to the pixel electrode PE via the data line DL. The data voltage, which is provided by the pad portion P, may also be provided to the shielding electrode SC via the second shielding contact hole SCH-2 and the shielding pad line SCPL as and the shielding voltage. The shielding pad line SCPL and the shielding electrode SC may include an oxide with a higher specific resistivity than the material of the data line DL. In an exemplary embodiment, the shielding electrode SC may include one of IZO, ITO, IGZO, and a combination thereof, for example. Due to the high resistivity of an oxide conductor used to provide the shielding electrode SC, a voltage drop may occur in the shielding electrode SC, which is connected to the data pad line DPL.

In the exemplary embodiment, the shielding electrode SC and the shielding pad line SCPL may be disposed on the same layer as the pixel electrode PE. That is, in the exemplary embodiment, unlike in the exemplary embodiment of FIGS. 1 to 3, the shielding electrode SC, the shielding pad line SCPL, and the pixel electrode PE may be disposed an upper passivation layer 180q to simplify the fabrication of the LCD 1.

Also, since a single mask may be used to connect the data line DL and the shielding electrode SC, the number of processes for providing the LCD 1 may be reduced. Also, the transmittance and the visibility of the LCD 1 may be improved.

Figure 9:
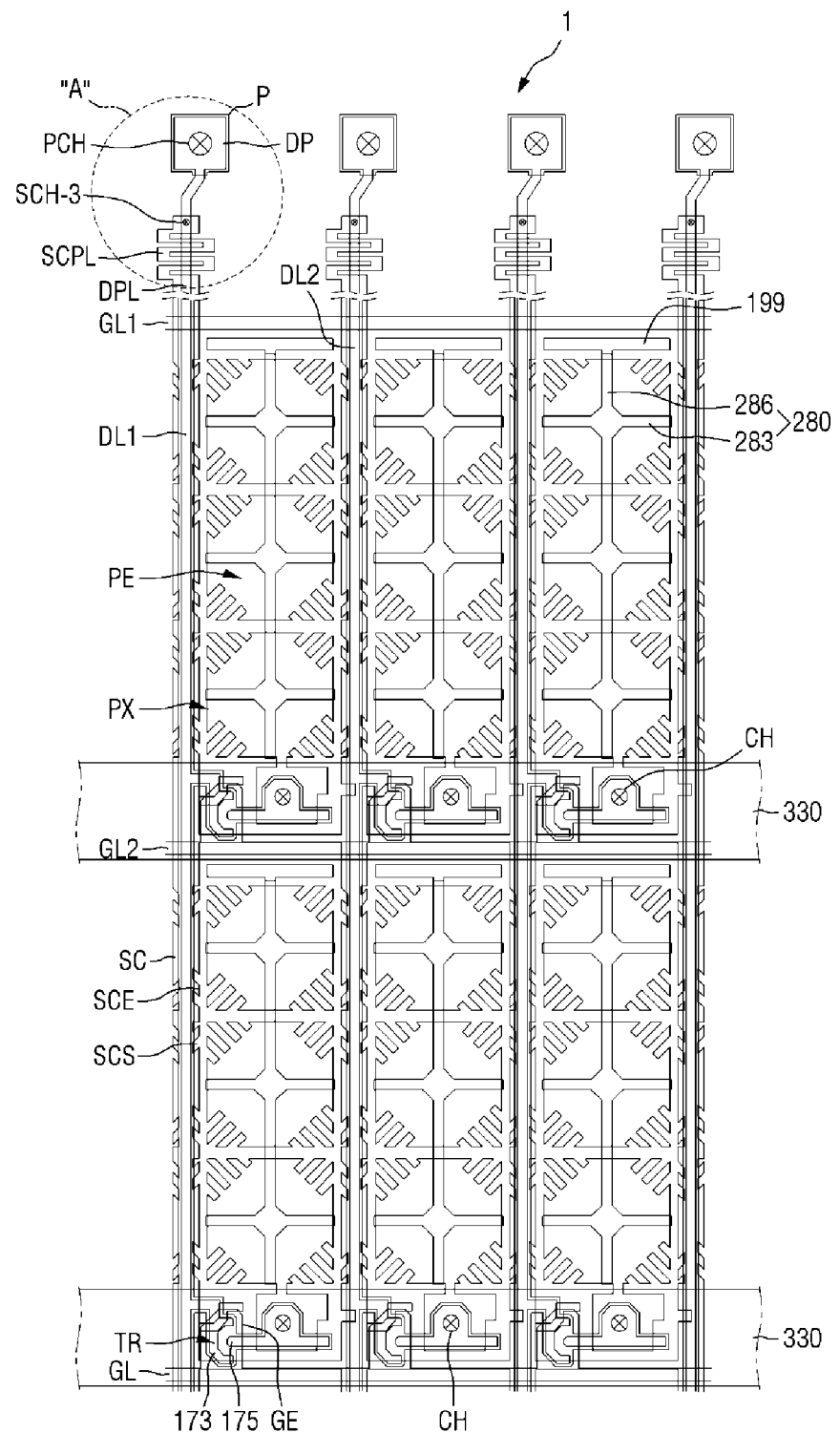
FIG. 9 is a plan view of another exemplary embodiment of an LCD according to the invention.
Figure 10:
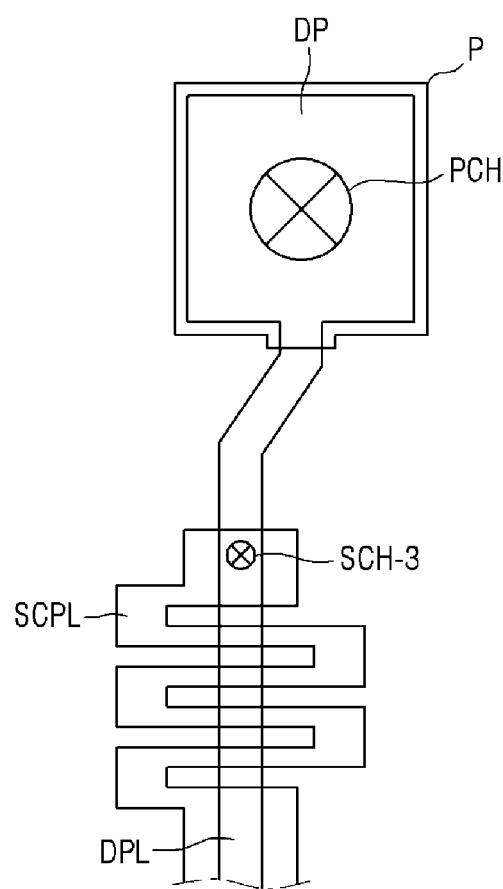
FIG. 10 is an enlarged view of area A of FIG. 9.

FIG. 9 is a plan view of an LCD according to another exemplary embodiment of the invention, and FIG. 10 is an enlarged view of area "A" of FIG. 9. In FIGS. 1 to 6, 9, and 10, like reference numerals refer to like elements, and any repetitive description will be omitted for convenience.

Referring to FIGS. 9 and 10, an LCD 1 according to another exemplary embodiment of the invention may drop a voltage to be applied to a shielding electrode SC in a display area by changing the shape of a shielding pad line SCPL disposed in a non-display area.

Resistance R may be defined by an equation $R=\rho L/A$, where $\rho$ represents specific resistance, L denotes length, and A denotes cross-sectional area. The resistance of an electrode varies depending on the properties of the material of the electrode, and may be increased by increasing the length of the electrode.

Accordingly, by increasing the length L of the shielding pad line SCPL, the voltage to be applied to the shielding electrode SC may be made to differ from a voltage to be applied to the data line DL. The shielding pad line SCPL, which is provided in the non-display area, may be provided in a zigzag shape to increase the resistance of the shielding pad line SCPL and thus to cause a voltage drop in the voltage to be applied to the shielding electrode SC. The shielding pad line SCPL and a data pad line DPL may be connected via a third shielding contact hole SCH-3. The third shielding contact hole SCH-3 is also applicable to the exemplary embodiment of FIGS. 1 to 3 and the exemplary embodiment of FIGS. 8 and 9.

Accordingly, in response to a voltage lower than a pixel voltage being applied to the shielding electrode SC, an electric field may be relatively weakened near the shielding electrode SC, and as a result, the force of control of liquid crystal molecules in an area where slit patterns 195a, 195b, 195c, and 195d are provided may be strengthened. Thus, even in an area where the slit patterns 195a, 195b, 195c, and 195d of a pixel electrode PE are defined and an area near liquid crystal control electrodes SCE of the shielding electrode SC, liquid crystal molecules may be aligned in a similar manner to the average liquid crystal azimuth in each domain, and thus, the transmittance and the visibility of the LCD 1 may be improved.

Figure 11:
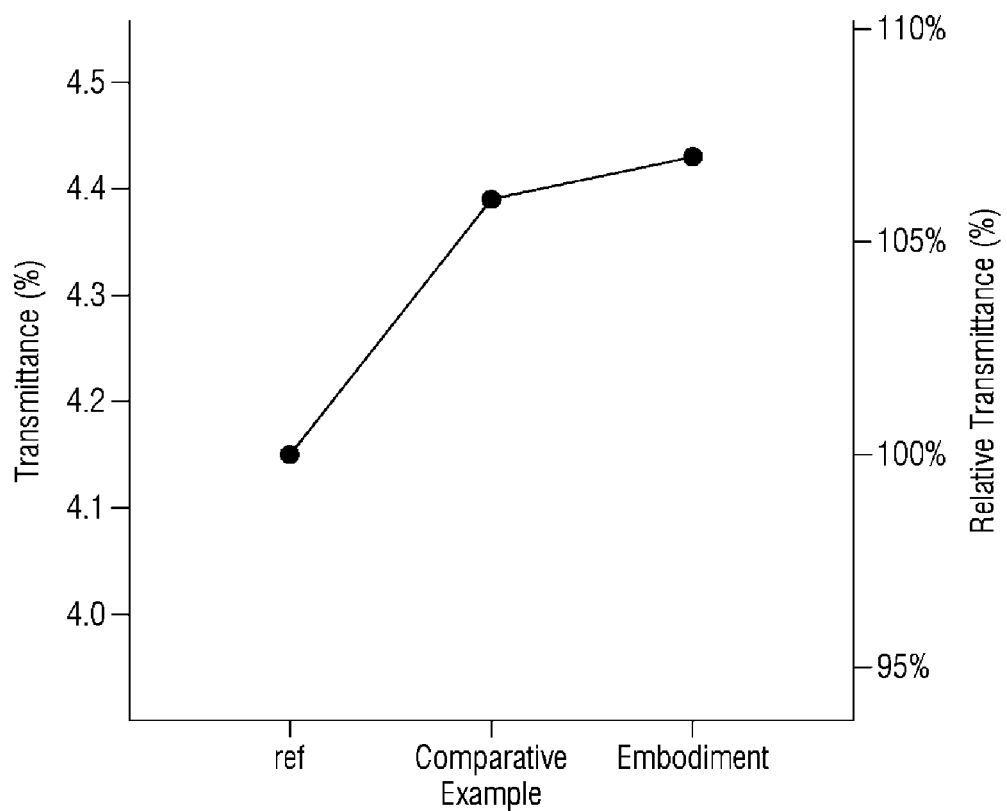
FIG. 11 is a graph showing a comparative example of the transmittances and the relative transmittances of an LCD according to an exemplary embodiment of the invention and an LCD.
Figure 12:
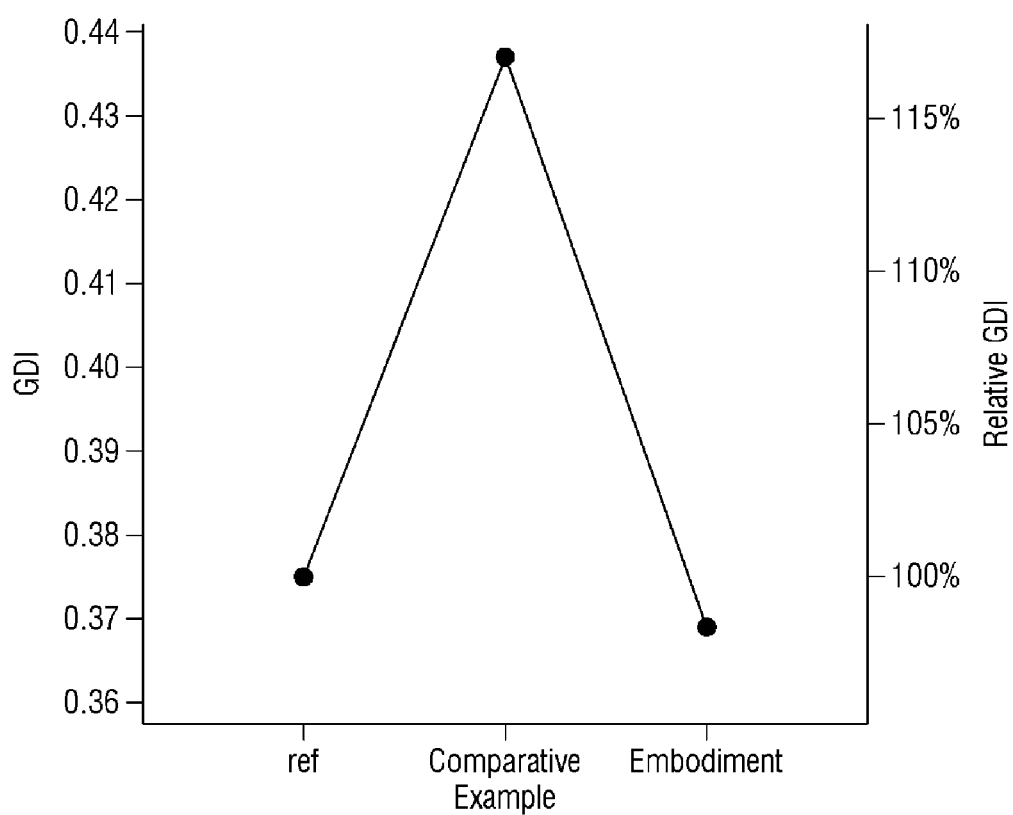
FIG. 12 is a graph showing a comparative example of the gamma curves and the relative gamma curves of an LCD according to an exemplary embodiment of the invention and an LCD.
Figure 13:
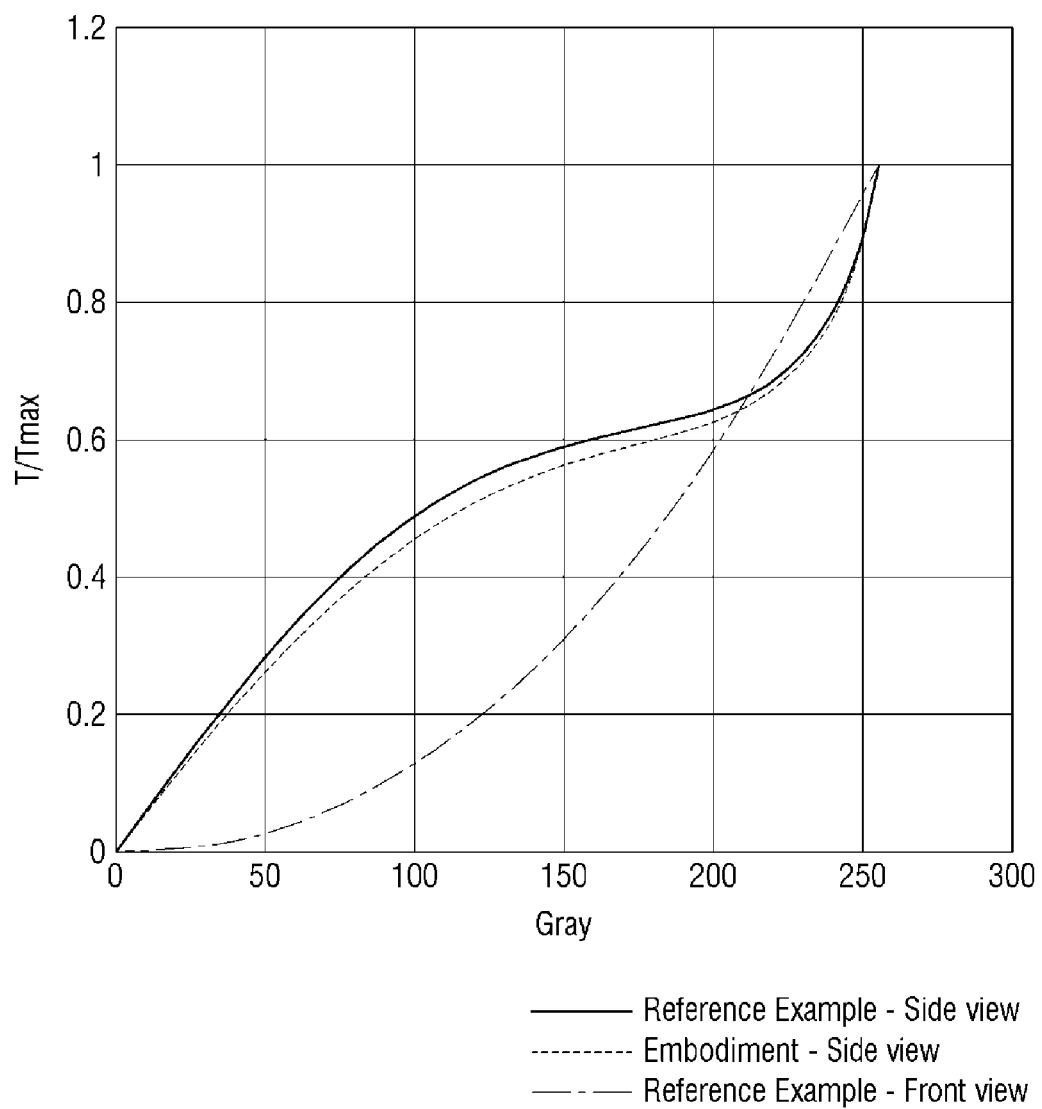
FIGS. 13 and 14 are graphs showing the gamma curve of an exemplary embodiment of an LCD according to the invention.
Figure 14:
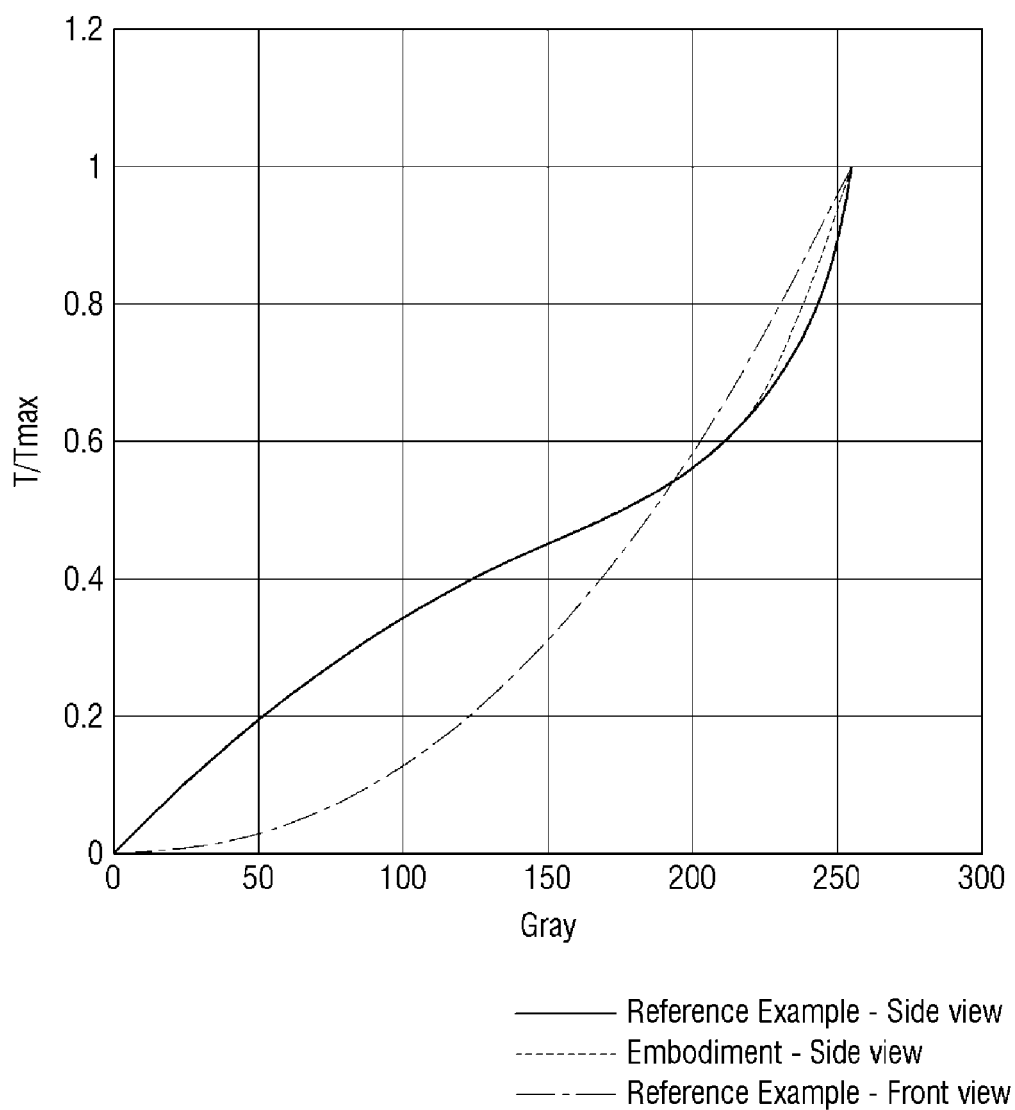

FIG. 11 is a graph showing the transmittances and the relative transmittances of an LCD according to exemplary embodiments of the invention and an LCD according to a comparative example, FIG. 12 is a graph showing the gamma curves and the relative gamma curves of the LCD according to exemplary embodiments of the invention and an LCD according to a comparative example, and FIGS. 13 and 14 are graphs showing the gamma curve of the LCD according to exemplary embodiments of the invention.

In FIGS. 1 to 6, 11, and 12, like reference numerals refer to like elements, and any repetitive description will be omitted for convenience.

Referring to FIGS. 11 through 14, a pixel electrode PE of an LCD 1 according to exemplary embodiments of the invention includes a whole pattern 192, which is disposed in the middle of a pixel PX, and branch electrodes 193a, 193b, 193c, and 193d, which are connected to the whole pattern 192. In the pixel PX, slit patterns 195a, 195b, 195c, and 195d, which separate the branch electrodes 193a, 193b, 193c, and 193d, may be further provided. A shielding electrode SC to which a voltage lower than a voltage applied to the pixel electrode PE may be disposed near the pixel electrode PE to overlap a data line DL.

Numeric data used to plot the graphs of FIGS. 11 and 12 may be summarized as shown in Table 1.

TABLE 1

|  | Reference Example | Comparative Example | Embodiment |
|---|---|---|---|
| Transmittance | 4.15 | 4.39 | 4.43 |
| Relative Transmittance | 100% | 106% | 107% |
| GDI | 0.375 | 0.437 | 0.369 |
| Relative GDI | 100% | 117% | 98% |

Referring to Table 1, "Reference Example" represents the transmittance and the gamma curve of an LCD in which the shielding electrode SC is not provided, "Comparative Example" indicates represents the transmittance and the gamma curve of an LCD in which the same voltage as a pixel voltage is applied to the shielding electrode SC, and "Embodiment" represents the transmittance and the gamma curve of an LCD 1 in which different voltages are applied to the shielding electrode SC and the pixel electrode PE.

The transmittance of the LCD 1 according to "Embodiment" was measured to be 4.43, which is higher than the transmittance of the LCD according to "Reference Example", i.e., 4.15, and the transmittance of the LCD according to "Comparative Example", i.e., 4.39, and this means that the transmittance of the LCD 1 according to "Embodiment" is improved compared to the LCD according to "Reference Example" and the LCD according to "Comparative Example". Also, when the transmittance of the LCD according to "Reference Example" is 100%, the LCD according to "Comparative Example" and the LCD 1 according to "Embodiment" show a 6% improvement and a 7% improvement, respectively, in transmittance compared to the LCD according to "Reference Example".

That is, according to Table 1, the transmittance of an LCD may be improved by driving liquid crystal molecules 302-1 in an area of the edges of the pixel electrode PE, which are aligned in parallel to the polarization axis of first and second polarizing plates 140 and 240, to have an average liquid crystal azimuth at which the transmittance may be maximized.

The GDI (Gamma Distortion Index) of the LCD according to "Comparative Example" was measured to be 0.437, the GDI of the LCD according to "Reference Example" was measured to be 0.375, and the GDI of the LCD according to "Embodiment" was measured to be 0.369. The relative GDI of the LCD according to "Reference Example" to the GDI of the LCD according to "Reference Example" was measured to be 117%, and the relative GDI of the LCD according to "Embodiment" to the GDI of the LCD according to "Reference Example" was measured to be 98%.

This means that by providing liquid crystal control electrodes SCE along the edges of a pixel PX, the number of liquid crystal molecules 302-1 irregularly arranged may be minimized, and as a result, the number of liquid crystal molecules 302 arranged to have an azimuth similar to an average liquid crystal azimuth may be increased.

In response to the liquid crystal molecules 302 being aligned to have a similar azimuth to an average liquid crystal azimuth, the transmittance of a pixel may be improved.

Accordingly, in response to a voltage lower than the pixel voltage being applied to the shielding electrode SC, an electric field may be relatively weakened near the shielding electrode SC, and as a result, the force of control of liquid crystal molecules in an area where slit patterns 195a, 195b, 195c, and 195d are provided may be strengthened. In an exemplary embodiment, a voltage which is lower than that of the pixel electrode by −2 V may be applied to the shielding electrode SC. Thus, even in an area where the slit patterns 195a, 195b, 195c, and 195d of the pixel electrode PE are provided and an area near the shielding electrode SC, liquid crystal molecules may be aligned in a similar manner to the average liquid crystal azimuth in each domain, and thus, the transmittance and the visibility of the LCD 1 may be improved.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:
1. A liquid crystal display comprising:
 a first substrate in which a pixel region is defined by a gate line and a data line intersecting the gate line, the pixel region being arranged in a matrix with other pixel regions;
 a pixel electrode disposed in the pixel region; and
 a shielding electrode disposed between the pixel electrode and another pixel electrode,
 wherein
 the shielding electrode is electrically connected to the data line and a different voltage from a voltage applied to the data line is applied to the shielding electrode, and an electrical field is generated between the shielding electrode and the pixel electrode.

2. The liquid crystal display of claim 1, wherein the voltage applied to the shielding electrode is lower than the voltage applied to the pixel electrode by about 1.5 volts to about 2.5 volts.

3. The liquid crystal display of claim 1, wherein the shielding electrode includes an electrode material having a higher specific resistivity than a material of the data line.

4. The liquid crystal display of claim 1, wherein the shielding electrode includes at least one selected of indium zinc oxide ("IZO"), indium tin oxide ("ITO"), indium gallium zinc oxide ("IGZO"), and a combination thereof.

5. The liquid crystal display of claim 1, wherein the shielding electrode is elongated in a zigzag shape.

6. The liquid crystal display of claim 1, further comprising:
   a second substrate facing the first substrate; and
   a liquid crystal layer including liquid crystal molecules, which are disposed between the first substrate and the second substrate,
   wherein the second substrate includes a common electrode, a different voltage from the voltage applied to the shielding electrode is applied to the common electrode, and the shielding electrode generates a similar potential to a potential generated by the pixel electrode.

7. The liquid crystal display of claim 6, wherein a horizontal cutout portion, which horizontally divides the pixel electrode, and a vertical cutout portion, which vertically divides the pixel electrode, are defined in the common electrode.

8. The liquid crystal display of claim 7, wherein a width of the horizontal and vertical cutout portions ranges from about 2 micrometers to about 5 micrometers.

9. The liquid crystal display of claim 6, wherein an electric field is relatively weakened in an area of overlap between the common electrode and the shielding electrode, compared to an electric field in the pixel electrode near the shielding electrode.

10. The liquid crystal display of claim 6, wherein liquid crystal control electrodes of the shielding electrode, which are disposed near slit patterns defined near edges of the pixel electrode, provide a vector for driving liquid crystal molecules disposed in an area of the edges of the pixel electrode and on the liquid crystal control electrodes to move regularly in a particular direction.

11. The liquid crystal display of claim 1, wherein the pixel electrode and the shielding electrode are spaced from each other by a distance of about 3 micrometers to about 5 micrometers.

12. The liquid crystal display of claim 1, wherein the pixel electrode includes a whole electrode and branch electrodes, which are provided in a shape of branches at corners of the pixel region.

13. The liquid crystal display of claim 12, wherein slit patterns, which separate the branch electrodes from one another by a predetermined gap, are defined in the pixel region.

14. The liquid crystal display of claim 13, wherein the shielding electrode includes liquid crystal control slits, which are arranged in a staggered manner with respect to the slit patterns defined in the pixel region.

15. The liquid crystal display of claim 12, wherein the shielding electrode includes liquid crystal control electrodes, which are arranged in a staggered manner with respect to the slit patterns defined in the pixel region.

16. The liquid crystal display of claim 12, wherein a direction in which the branch electrodes or the slit patterns extend is the same as an azimuth of the liquid crystal molecules.

17. The liquid crystal display of claim 1, wherein a horizontal field is generated between the shielding electrode and the pixel electrode.

18. The liquid crystal display of claim 1, further comprising:
   a data pad line extending from the data line into a non-display area;
   a data pad disposed at an end of the data pad line;
   a pad portion disposed on the data pad;
   a pad line extending from the pad portion;
   a shielding pad line disposed to overlap a part of the pad line and extending from the shielding electrode into the non-display area; and
   a first shielding contact hole connecting a part of the shielding pad line and the part of the pad line.

19. The liquid crystal display of claim 1, further comprising:
   a data pad line extending from the data line into a non-display area;
   a data pad disposed at an end of the data pad line;
   a shielding pad line disposed to overlap a part of the data pad line and extending from the shielding electrode into the non-display area; and
   a second shielding contact hole connecting a part of the shielding pad line and the part of the data pad line.

* * * * *